US012614232B2

(12) United States Patent
Cruttenden et al.

(10) Patent No.: US 12,614,232 B2
(45) Date of Patent: Apr. 28, 2026

(54) SYSTEMS AND METHODS FOR CREATING EXCESS FUNDS FROM RETAIL TRANSACTIONS AND APPORTIONING THOSE FUNDS INTO INVESTMENTS

(71) Applicant: Acorns Grow Incorporated, Irvine, CA (US)

(72) Inventors: Jeffrey Cruttenden, Newport Beach, CA (US); Walter Cruttenden, Corona del Mar, CA (US); Zachariah Cooper, Irvine, CA (US)

(73) Assignee: Acorns Grow Incorporated, Irvine, CA (US)

( * ) Notice: Subject to any disclaimer, the term of this patent is extended or adjusted under 35 U.S.C. 154(b) by 399 days.

(21) Appl. No.: 17/384,607

(22) Filed: Jul. 23, 2021

(65) Prior Publication Data

US 2022/0188933 A1 Jun. 16, 2022

Related U.S. Application Data

(63) Continuation of application No. 15/592,093, filed on May 10, 2017, now Pat. No. 11,176,614, which is a (Continued)

(51) Int. Cl.
*G06Q 40/06* (2012.01)
(52) U.S. Cl.
CPC .................................... *G06Q 40/06* (2013.01)
(58) Field of Classification Search
CPC ...................................................... G06Q 40/06
See application file for complete search history.

(56) References Cited

U.S. PATENT DOCUMENTS

| 3,573,747 | A | 4/1971 | Adams et al. |
| 4,108,361 | A | 8/1978 | Krause |

(Continued)

FOREIGN PATENT DOCUMENTS

| JP | 2002507015 | 3/1999 |
| WO | WO 96/34358 | 10/1996 |

(Continued)

OTHER PUBLICATIONS

Acorns Is a Micro-Investment App That Does All the Thinking for You [online]. Techcrunch, Aug. 26, 2014. [retrieved on Mar. 15, 2016]. pp. 1-6. Retrieved from the Internet. http://techcrunch.com/2014/08/26/acorns-is-a-microinvestment-app-that-does-all-thethinkinQ-for-vou.

(Continued)

*Primary Examiner* — Daniel S Felten
(74) *Attorney, Agent, or Firm* — Knobbe, Martens, Olson & Bear, LLP

(57) ABSTRACT

This invention relates generally to the field of creating and distributing investment funds, and more particularly to systems and methods for creating excess funds from consumer transactions and distributing those funds into one or more investment accounts. Preferred embodiments of the present invention provide systems and methods for selecting transactions in a user's spending account to be rounded-up to the nearest dollar, creating a supplemental charge once the aggregation of those round-ups reach a specified minimum, and providing a closed system where the aggregated microcharges may be converted into investments for long-term savings and growth.

18 Claims, 26 Drawing Sheets

Related U.S. Application Data continuation-in-part of application No. 13/830,579, filed on Mar. 14, 2013, now Pat. No. 10,937,097.

(56) References Cited

U.S. PATENT DOCUMENTS

| | | | |
|---|---|---|---|
| 4,750,119 A | 6/1988 | Cohen et al. | |
| 4,751,640 A | 6/1988 | Lucas et al. | |
| 4,882,473 A | 11/1989 | Bergeron et al. | |
| 5,202,826 A | 4/1993 | McCarthy | |
| 5,205,826 A | 4/1993 | Chen et al. | |
| 5,297,026 A | 3/1994 | Hoffman | |
| 5,483,444 A | 1/1996 | Heintzeman et al. | |
| 5,513,102 A | 4/1996 | Auriemma | |
| 5,537,314 A | 7/1996 | Kanter | |
| 5,621,640 A | 4/1997 | Burke | |
| 5,689,100 A | 11/1997 | Carrithers et al. | |
| 5,734,838 A | 3/1998 | Robinson et al. | |
| 5,774,870 A | 6/1998 | Storey | |
| 5,787,404 A | 7/1998 | Fernandez-Holman | |
| 5,890,963 A | 4/1999 | Yen | |
| 5,970,480 A | 10/1999 | Kalina | |
| 5,991,736 A | 11/1999 | Ferguson et al. | |
| 6,070,153 A | 5/2000 | Simpson | |
| 6,076,166 A | 6/2000 | Moshfeghi et al. | |
| 6,088,682 A | 7/2000 | Burke | |
| 6,105,865 A | 8/2000 | Hardesty | |
| 6,112,191 A | 8/2000 | Burke | |
| 6,164,533 A | 12/2000 | Barton | |
| 6,598,028 B1 | 7/2003 | Sullivan | |
| 6,876,971 B1 | 4/2005 | Burke et al. | |
| 6,876,978 B1 | 4/2005 | Walker et al. | |
| 6,912,509 B1 | 6/2005 | Lear | |
| 6,941,279 B1 | 9/2005 | Sullivan | |
| 7,028,827 B1 | 4/2006 | Molbak et al. | |
| 7,264,153 B1 | 9/2007 | Burke | |
| 7,447,651 B1* | 11/2008 | Herbst | G06Q 40/06 |
| | | | 705/36 R |
| 7,480,634 B1* | 1/2009 | Cornelius | G06Q 20/10 |
| | | | 705/39 |
| 7,502,758 B2 | 3/2009 | Burke | |
| 7,571,849 B2 | 8/2009 | Burke | |
| 7,574,403 B2 | 8/2009 | Webb et al. | |
| 7,577,604 B2 | 8/2009 | Ogilvie | |
| 7,606,751 B2* | 10/2009 | Tarbox | G06Q 40/04 |
| | | | 705/35 |
| 7,653,596 B2* | 1/2010 | Crane | G06Q 40/06 |
| | | | 705/35 |
| 7,765,147 B2 | 7/2010 | Khoury | |
| 7,831,494 B2 | 11/2010 | Sloan et al. | |
| 7,933,831 B2* | 4/2011 | Khoury | G06Q 99/00 |
| | | | 705/37 |
| 7,991,677 B2* | 8/2011 | Haggerty | G06Q 40/08 |
| | | | 705/36 R |
| 8,025,217 B2 | 9/2011 | Burke | |
| 8,195,576 B1 | 6/2012 | Grigg et al. | |
| 8,234,188 B1 | 7/2012 | Phillips et al. | |
| 8,255,329 B1 | 8/2012 | Barth et al. | |
| 8,301,530 B2 | 10/2012 | Caretta | |
| 8,370,243 B1 | 2/2013 | Cernyar | |
| 8,416,924 B1 | 4/2013 | Barth et al. | |
| 8,458,026 B2 | 6/2013 | Voltmer et al. | |
| 8,464,935 B2 | 6/2013 | Hansen et al. | |
| 8,583,515 B2 | 11/2013 | Sorbe et al. | |
| 8,626,579 B2* | 1/2014 | Fordyce, III | G06Q 30/0267 |
| | | | 705/14.1 |
| 8,732,089 B1 | 5/2014 | Fang et al. | |
| 8,768,813 B2* | 7/2014 | Palmeri | G06Q 40/02 |
| | | | 705/36 R |
| 8,781,906 B2* | 7/2014 | Cruttenden | G06Q 20/20 |
| | | | 705/16 |
| 8,791,949 B1 | 7/2014 | Mackrell | |
| 8,799,153 B2 | 8/2014 | White et al. | |
| 9,043,237 B2* | 5/2015 | McCarthy | G06Q 20/02 |
| | | | 713/184 |
| 9,244,601 B2 | 1/2016 | Kim et al. | |
| 9,734,536 B2 | 8/2017 | Cruttenden et al. | |
| 9,747,597 B2 | 8/2017 | Wu | |
| 9,794,797 B2* | 10/2017 | Hoffberg | G06Q 50/188 |
| 9,830,648 B2 | 11/2017 | Kanjila et al. | |
| 9,836,736 B1 | 12/2017 | Neale et al. | |
| 9,842,321 B2 | 12/2017 | Johnston et al. | |
| 9,953,373 B2* | 4/2018 | Winters | G06Q 30/0201 |
| 9,990,642 B2 | 6/2018 | Strock et al. | |
| 10,097,663 B1 | 10/2018 | Ferenczi et al. | |
| 10,157,420 B2 | 12/2018 | Narayana et al. | |
| 10,275,827 B2* | 4/2019 | McCarthy | G06Q 40/02 |
| 10,410,243 B2 | 9/2019 | Boal | |
| 10,521,862 B2 | 12/2019 | Cruttenden et al. | |
| 10,810,673 B1* | 10/2020 | Prasad | G06Q 40/06 |
| 10,872,341 B1 | 12/2020 | Beckman et al. | |
| 10,937,097 B1 | 3/2021 | Cruttenden et al. | |
| 10,943,242 B2* | 3/2021 | Kinkead | G06Q 30/02 |
| 11,107,332 B1 | 8/2021 | Velline et al. | |
| 11,176,614 B1 | 11/2021 | Cruttenden et al. | |
| 11,348,179 B2 | 5/2022 | Cruttenden et al. | |
| 11,625,771 B2* | 4/2023 | McCarthy | G06Q 40/02 |
| | | | 235/379 |
| 2002/0042742 A1 | 4/2002 | Glover et al. | |
| 2002/0046124 A1 | 4/2002 | Alderucci et al. | |
| 2002/0052818 A1 | 5/2002 | Loveland | |
| 2002/0062272 A1 | 5/2002 | Kim et al. | |
| 2002/0123954 A1 | 9/2002 | Hito | |
| 2002/0138383 A1 | 9/2002 | Rhee | |
| 2002/0156722 A1 | 10/2002 | Greenwood | |
| 2002/0174045 A1* | 11/2002 | Arena | G06Q 40/10 |
| | | | 705/36 R |
| 2002/0198799 A1 | 12/2002 | Burden | |
| 2003/0050889 A1 | 3/2003 | Burke | |
| 2003/0074311 A1 | 4/2003 | Saylors et al. | |
| 2003/0083930 A1 | 5/2003 | Burke | |
| 2003/0093353 A1 | 5/2003 | Ward et al. | |
| 2003/0125108 A1 | 7/2003 | Groz | |
| 2003/0149629 A1 | 8/2003 | Claridge et al. | |
| 2003/0163404 A1 | 8/2003 | Hu et al. | |
| 2003/0191711 A1 | 10/2003 | Jamison et al. | |
| 2003/0200163 A1 | 10/2003 | O'Riordan et al. | |
| 2003/0225649 A1 | 12/2003 | Simpson | |
| 2004/0222285 A1 | 11/2004 | Pohl | |
| 2004/0243498 A1 | 12/2004 | Duke | |
| 2005/0044038 A1 | 2/2005 | Whiting et al. | |
| 2005/0240521 A1 | 10/2005 | Fuentes-Torres | |
| 2006/0036523 A1 | 2/2006 | Stover et al. | |
| 2006/0047589 A1 | 3/2006 | Grau | |
| 2007/0011089 A1 | 1/2007 | DeSchryver | |
| 2007/0033134 A1 | 2/2007 | Carettea et al. | |
| 2007/0034688 A1 | 2/2007 | Burke | |
| 2007/0043666 A1 | 2/2007 | Burdette | |
| 2007/0061252 A1 | 3/2007 | Burke | |
| 2007/0094130 A1 | 4/2007 | Burke | |
| 2007/0157105 A1 | 7/2007 | Owens et al. | |
| 2007/0167219 A1 | 7/2007 | Groz | |
| 2007/0185810 A1* | 8/2007 | Kalra | G06Q 20/102 |
| | | | 705/40 |
| 2007/0294158 A1 | 12/2007 | Patel et al. | |
| 2008/0010201 A1 | 1/2008 | Pratt | |
| 2008/0065532 A1 | 3/2008 | De La Motte | |
| 2008/0162377 A1 | 7/2008 | Pinkas | |
| 2008/0228661 A1* | 9/2008 | Silitch | G06Q 40/06 |
| | | | 705/36 R |
| 2008/0249957 A1 | 10/2008 | Masuyama et al. | |
| 2008/0255951 A1 | 10/2008 | Miller et al. | |
| 2008/0288398 A1 | 11/2008 | Maricondi | |
| 2009/0063332 A1 | 3/2009 | Tabaczynski et al. | |
| 2009/0089104 A1 | 4/2009 | Kondacks | |
| 2009/0106161 A1 | 4/2009 | Alemany | |
| 2009/0150284 A1 | 6/2009 | Burke | |
| 2009/0150286 A1 | 6/2009 | Barton | |
| 2009/0177564 A1 | 7/2009 | Burke | |
| 2009/0181777 A1 | 7/2009 | Christiani et al. | |
| 2009/0198625 A1 | 8/2009 | Walker et al. | |
| 2009/0204503 A1 | 8/2009 | Hursta | |
| 2009/0204528 A1 | 8/2009 | Moses | |
| 2009/0215537 A1 | 8/2009 | Poff | |

(56) References Cited

U.S. PATENT DOCUMENTS

| | | | |
|---|---|---|---|
| 2009/0318220 A1 | 12/2009 | Arezina et al. | |
| 2010/0005034 A1 | 1/2010 | Carpenter et al. | |
| 2010/0005035 A1 | 1/2010 | Carpenter et al. | |
| 2010/0121723 A1 | 5/2010 | Miller et al. | |
| 2010/0124986 A1 | 5/2010 | Van Luchene | |
| 2010/0228684 A1* | 9/2010 | Sacks | G06Q 40/06 |
| | | | 705/36 R |
| 2010/0250436 A1 | 9/2010 | Loevenguth et al. | |
| 2011/0004514 A1 | 1/2011 | Thomas | |
| 2011/0125637 A1 | 5/2011 | Kalra et al. | |
| 2011/0137913 A1 | 6/2011 | Bhatti et al. | |
| 2011/0238573 A1* | 9/2011 | Varadarajan | G06Q 20/3263 |
| | | | 705/43 |
| 2011/0251892 A1* | 10/2011 | Laracey | G06Q 20/20 |
| | | | 705/16 |
| 2011/0307318 A1 | 12/2011 | LaPorte et al. | |
| 2012/0116992 A1 | 5/2012 | Tuchman | |
| 2012/0123849 A1 | 5/2012 | Armstrong | |
| 2012/0173454 A1 | 7/2012 | Shah et al. | |
| 2012/0231878 A1 | 9/2012 | Angelo | |
| 2012/0233089 A1 | 9/2012 | Calman et al. | |
| 2012/0233090 A1 | 9/2012 | Tavares | |
| 2012/0259762 A1 | 10/2012 | Tarighat et al. | |
| 2013/0013530 A1 | 1/2013 | Nowacki | |
| 2013/0111600 A1 | 5/2013 | Guenther | |
| 2013/0138577 A1 | 5/2013 | Sisk | |
| 2013/0166476 A1 | 6/2013 | Samson | |
| 2013/0187780 A1 | 7/2013 | Angelides | |
| 2013/0198108 A1 | 8/2013 | Walia et al. | |
| 2013/0204726 A1* | 8/2013 | Cruttenden | G06Q 40/06 |
| | | | 705/21 |
| 2013/0332388 A1* | 12/2013 | Martell | A63F 13/35 |
| | | | 705/36 R |
| 2014/0040121 A1 | 2/2014 | Robb et al. | |
| 2014/0052594 A1 | 2/2014 | Zimmer et al. | |
| 2014/0098030 A1 | 4/2014 | Tang | |
| 2014/0180790 A1 | 6/2014 | Boal | |
| 2014/0180793 A1 | 6/2014 | Boal | |
| 2014/0180806 A1 | 6/2014 | Boal | |
| 2014/0180826 A1 | 6/2014 | Boal | |
| 2014/0189608 A1 | 7/2014 | Shuttleworth et al. | |
| 2014/0223347 A1 | 8/2014 | Seo et al. | |
| 2014/0279185 A1 | 9/2014 | Merz et al. | |
| 2014/0281946 A1 | 9/2014 | Avni et al. | |
| 2015/0081458 A1 | 3/2015 | Cruttenden et al. | |
| 2015/0120425 A1 | 4/2015 | Caldwell | |
| 2015/0278956 A1* | 10/2015 | Dornbusch | G06Q 40/06 |
| | | | 705/36 R |
| 2015/0339280 A1 | 11/2015 | McLaughlin et al. | |
| 2015/0379485 A1* | 12/2015 | Danielak | G06Q 40/06 |
| | | | 705/36 R |
| 2016/0012392 A1 | 1/2016 | Paden et al. | |
| 2016/0259413 A1 | 9/2016 | Anzures et al. | |
| 2016/0266724 A1 | 9/2016 | Plumb-Larrick et al. | |
| 2016/0321214 A1 | 11/2016 | Hickey | |
| 2016/0335479 A1 | 11/2016 | Barlett, II et al. | |
| 2016/0335653 A1 | 11/2016 | Bodington | |
| 2017/0272249 A1 | 9/2017 | Bhandarkar et al. | |
| 2017/0345098 A1 | 11/2017 | Cruttenden et al. | |
| 2018/0101914 A1* | 4/2018 | Samuel | G06Q 20/401 |
| 2018/0227370 A1 | 8/2018 | Robles et al. | |
| 2018/0341933 A1 | 11/2018 | Renke et al. | |
| 2018/0364665 A1 | 12/2018 | Clymer et al. | |
| 2019/0095064 A1 | 3/2019 | Alexander | |
| 2019/0146639 A1 | 5/2019 | Sarode et al. | |
| 2019/0237189 A1 | 8/2019 | Geller et al. | |
| 2019/0304020 A1* | 10/2019 | Bhargava | G06Q 20/24 |
| 2020/0074555 A1 | 3/2020 | Cruttenden et al. | |
| 2020/0077483 A1 | 3/2020 | Agarwal et al. | |
| 2020/0159871 A1 | 5/2020 | Bowen et al. | |
| 2020/0234372 A1* | 7/2020 | Starr | G06Q 40/06 |
| 2020/0258176 A1 | 8/2020 | Gibson | |
| 2020/0304626 A1 | 9/2020 | Phillips et al. | |
| 2020/0393952 A1 | 12/2020 | Hsiao | |
| 2021/0174451 A1 | 6/2021 | Cruttenden et al. | |
| 2023/0048957 A1 | 2/2023 | Cruttenden et al. | |

FOREIGN PATENT DOCUMENTS

| | | | | |
|---|---|---|---|---|
| WO | WO-0122341 A1 * | 3/2001 | ............ | G06Q 40/06 |
| WO | WO-2008092110 A1 * | 7/2008 | ............ | G06Q 40/06 |
| WO | WO-2008137735 A2 * | 11/2008 | ............ | G06Q 40/00 |
| WO | WO 2011/103520 | 8/2011 | | |
| WO | WO-2015170134 A1 * | 11/2015 | ............ | G06Q 50/01 |

OTHER PUBLICATIONS

Acorns—Invest, Earn, Grow, Spend, Later, acorns.com [online], available by Sep. 4, 2014 as verified by Wayback Machine®, [retrieved on Feb. 10, 2021], retrieved from the Internet <URL: https://web.archive.org/web/20140904101831 /https://www.acorns. com/ > (Year: 2014). 5 pages.

Acorns App Makes You a Better Saver, by Bozzo, smartphone. gadgethacks.com [online], published on Oct. 14, 2014, [retrieved on Feb. 11, 2021], retrieved from the Internet <URL: https://smartphones. gadgethacks.com/how-to/acorns-app-makes-you-better-saver-withoutyou-even-noticing-0157807/> (Year: 2014). 1 page.

Acorns Review [online]. 148Apps, Oct. 6, 2014 [retrieved on Mar. 15, 2016]. pp. 1-18. Retrieved from the Internet. < http://www. 148apps.com/reviews/acorns-review-3/>.

Acorns App Wants to Invest Your Spare Change [online]. Direkt Concept. pp. 1-2. Jun. 18, 2014. [retrieved on Mar. 15, 2016]. Retrieved from the Internet. < http:/ /www. di rektconcept. com/ 2014/06/18/acorns-app-wants-to-invest-soare-change/>.

"Aggregate Transaction Data." Plaid, (Sep. 22, 2015). https://plaid. com/solutions/transaction-data/. Web. Accessed on Apr. 20, 2017. 5 pages.

Duncan, Shelli. "Planting Acorns: When It Comes to Investing, Small Steps Can Yield Big Rewards." Modern Hygienist 3.9 (2007): 44–. Print. (Year: 2007) 5 pages.

Golio, Mike. "Live Below Your Means (LBYM)," in Engineering Your Retirement: Retirement Planning for Technology Professionals, IEEE, 2006, pp. 45-69, doi: 10.1002/9780470112472.ch3. (Year: 2006).

Golio, Mike. "Your Investment Plan," in Engineering Your Retirement: Retirement Planning for Technology Professionals, IEEE, 2006, pp. 115-148, doi: 10.1002/9780470112472.ch6. (Year: 2006).

Newsweek: Cover story: 'Technology: What You'll Want Next'. (May 23, 1999). PR Newswire. 15 pages. Retrieved from http:// search.proquest.com/docview/449709031?accountid=14753. Retrieved on Mar. 29, 2016.

The Complete Guide to Account Aggregation. BlueLeaf, (Jul. 24, 2014). https://www.blueleaf.com/what-is-account-aggregation/. Web. Accessed on Apr. 20, 2017. 1 0 pages.

Remote Control Relay, apkpure.com [online], published on Jan. 20, 2016, [retrieved on Oct. 21, 2020], retrieved from the Internet <URL: https://apkpure.com/remote-control-relay/com.androidream. remotecontrolrelay> (Year: 2016). 2 pages.

"Robinhood.com" Robinhood.com, 2014. Web Aug. 23, 2016. 11 pages.; <<https://www.robinhood.com/>>.

Symons, A. (1998). "Making the connection through technology." Drug Store News, 20(20), 57-57, 107+. 4 pages. Retrieved from http://search.proquest.com/docview/204728199?accountid=14753. Retrieved on Mar. 29, 2016.

Specification filed Mar. 20, 2000 in U.S. Appl. No. 09/531,412, related application data for U.S. Pat. No. 7,574,403 (Year: 2000). 69 pages.

Yogesh, "Create a line slider on a graph in android—Stack Overflow", Jun. 2, 2020, 1 page.

* cited by examiner

FIGURE 3

When no transactions are selected, the grey button above is shown.

3000

2010

SYSTEMS AND METHODS FOR CREATING EXCESS FUNDS FROM RETAIL TRANSACTIONS AND APPORTIONING THOSE FUNDS INTO INVESTMENTS

CROSS-REFERENCE TO RELATED APPLICATIONS

This application claims priority to and is a continuation of U.S. patent application Ser. No. 15/592,093, filed on May 10, 2017, which claims priority to U.S. patent application Ser. No. 13/830,579, filed Mar. 14, 2013. The contents of both applications are hereby incorporated by reference herein in entirety.

TECHNICAL FIELD

This invention relates generally to the field of creating and distributing investment funds, and more particularly to systems and methods for creating excess funds from credit transactions and distributing those funds into one or more investment accounts.

BACKGROUND

It is well known that individuals must set up savings accounts retirement accounts and as early as possible. While some experts claim that a person will only need 70% of their pre-retirement pay after they retire, other studies have shown that retirees must save up to 126% of their ending salary to maintain their standard of living, factoring in inflation and medical cost increases.

As of 2012, U.S. Census Bureau has estimated that the average life expectancy of an individual is 78.5 years, and that the average retirement age was 62 years of age, which means that a person must, on average, plan for 16.5 years of retirement. It is also known that the anticipated length of retirement will fluctuate with changes to social security funding, healthcare costs, the tax code, as well as concurrent medical advances increasing life expectancy.

Based on certain assumptions, Time Magazine conservatively estimates that a person whose household earnings were $75,000 a year would need $1,000,000.00 in savings (in today's dollars) if they retired at the age of 62. Other sources indicate that the amount could be twice-as-much or half-as-much, based on other assumptions. Irrespective of the final calculus, one common principle emerges: a person must set-aside a large nest egg in order to retire comfortably.

Toward that end, a variety of financial investment programs exist, such as long-term investment plans that allow the average person to save for their future.

Traditionally, these programs are set up by individuals and/or employers, and come in a number of forms, including deposit accounts, equities (e.g. stocks), debt securities (e.g. bonds), index and mutual funds, government securities (e.g. T-bills, etc.), insurance vehicles (e.g. term-life plans), and real estate investments (e.g., properties, REITs, etc.).

Retirement accounts set up by individuals are usually modest in size, scope, and return because of the investor's lack of sophistication. Moreover, even for the financially savvy, there is a lack of access to premium financial investments which are often complex, require substantial minimum investments, and necessitate regular management.

For this reason as well as others, many large institutions and employers have attempted to bridge the gap by providing umbrella programs, such as pension plans. Pension plans usually take the form of defined benefits programs (e.g.

IRAs and 401(k) derived from a portion of the employee's income) and/or defined contributions programs (same as a defined benefits program, except that a portion of the investment is "matched" by the employer). Future payouts are based on the performance of the underlying investments.

When used correctly, these programs not only promote economic growth but also promote personal financial safety. Investing allows for economic expansion and market liquidity, while concurrently affording prospective gains for the investor. The most effective long-term investments are optimized to maximum return while controlling market fluctuation at acceptable risk thresholds. Many bear low risk while offering significant yields. As those of ordinary skill in the art would appreciate, methods for reducing investment risk are best explained in Modern Portfolio Theory (MPT) which include, but are not limited to, diversification and hedging strategies. These concepts are well understood and appreciated.

It is not uncommon for well-managed investments to earn double-digit returns, which are often significantly higher than afforded by a traditional bank account. For example, over the last 25 years, the average return of the Standard and Poor's 500 (S&P 500) was 10.6%, while the average bank interest rate was under 6%. And when one compensates for 3% inflation, investments have shown multiples higher return than ordinary deposit accounts.

Unfortunately, despite the potential reward of investing with risk-aversion techniques, many individuals fail to establish any long-term investment plan. In some cases, these programs are not available to a large portion of the population. Even where available, many individuals lack the motivation to invest over a long period of time because it is difficult to visualize aggregate returns without sufficient investment expertise. Moreover, transactions costs (e.g., fees, commissions, and so on) are a deterrent.

Notwithstanding, the "retirement problem" for millions of people remain. Saving hundreds of thousands of dollars, or even millions of dollars in a retirement account—or ten to twenty times a person's annual salary—is generally seen as an unattainable amount of money.

But the simple fact of the matter is that it is not. With disciplined saving starting at an early age, and average market returns, an individual need only set-aside approximately 15% of his or her income every pay-period.

But most individuals are not financially disciplined. Easy access to credit, widely-publicized tales of overnight riches and extravagant lifestyles, and irrational exuberance has conditioned most individuals to spend money rather than save it. With a credit card in hand, and a quick flick of the wrist, consumers are accustomed to the joyous instant gratification that follows. Indeed, over the last 20 years, the U.S. Federal Reserve has found that the average personal savings rate (i.e. the difference between spending and income) has fluctuated from a low of 1% to a high of 8%, with a long-term average of 6.9%. The shortfall can have disastrous consequences for a potential retiree.

Thus, in applicant's view, the problem is not challenging society-wide views of fiscal responsibility, but rather revising the manner that individuals perceive the savings and investing process. In other words, if saving is looked at as an expense with the potential for significant returns, rather than something that gets in the way of immediate spending, then an individual is far more likely to save.

One method for encouraging savings is to add a self-imposed "tax" during routine consumer transactions. For example, a current approach allows consumers to save and/or donate a portion of a credit or debit transaction. An example is disclosed in U.S. Pat. No. 6,112,191, to Burke, filed Apr. 27, 1995, for a "Method and System to Create and Distribute Excess Funds from Consumer Spending Transactions," which is hereby incorporated by reference in its entirety. The system rounds up any credit or debit transaction to the nearest dollar and allows the consumer to save the difference between the actual transaction price and the rounded amount in a surplus account. This approach creates excess funds from spending transactions and provides an immediate opportunity to set aside these assets at the point of sale.

Although these systems are effective for creating opportunities to save, they are utterly lacking when it comes to facilitating actual long-term investing. Specifically, two additional problems remain:

First, current approaches only set aside the excess funds for future consumption (i.e., saved) rather than investing in hopes of realizing higher long-term returns. In other words, current systems only allow consumers to apportion funds for potential investment, but not actually invest those funds. Consumers must manually move funds between a surplus account and an investment account, pro-actively search for investment vehicles (i.e. researching their expected future return), decide upon tolerable risk profiles for their portfolio, and continuously manage those investments.

Second, current systems do not motivate long-term investment because future values are difficult to conceptualize in the abstract. Unless a consumer can visualize expected future returns (either with individual investments or a portfolio thereof), that consumer remains reluctant to invest surplus funds into productive assets. But current systems fail because they assume consumers possess adequate financial knowledge to enable them to realize long-term returns. Many investors, particularly the inexperienced, may not see the immediate benefit of saving. Without immediate knowledge of prospects for significant future returns, the opportunity to save alone may not overcome a pre-conceived reluctance to defer funds.

The compound effect of these two limitations undermine their intended purpose: motivating consumers to save for their future. In other words, techniques that only allow a consumer to save excess funds during a transaction rarely provides the consumer with potential investment benefits in real-time. Thus, even prior to considering investment options, current systems do not overcome a consumer's lack of motivation to save. Like a driver without a roadmap, current systems fail to provide direction to a desired destination.

An additional limitation of these systems is a lack of participation of vendors that a particular consumer is utilizing in the savings process. While these aforementioned systems may set aside excess funds for a user, they do not allow a vendor to also add funds and thereby incentivize further commerce with that vendor. A significant missed opportunity for both the user and vendor exists.

Accordingly, an improved system and method for creating a nexus between savings/investments and accompanying consumer transactions is desirable.

SUMMARY

To improve upon existing systems, preferred embodiments of the present invention provide a system and method for creating excess funds from retail transactions and apportioning those funds into investments. One preferred system, for example, can include a consumer communication device (i.e. a user device) configured to read consumer transactions, either directly or indirectly, from one or more financial data sources, such as banking, credit card, investment data stores. The system may also include a central server to which the user device connects over a data network. The user device is operatively coupled to a computer program product, the computer program product having a computer-usable medium including a sequence of instructions which, when executed by a processor, causes said processor to execute a process that virtually round-up the user's transactions to the nearest dollar, execute a financial charge/transfer into a designated investment account when the virtual round-ups meet a minimum threshold, and provide the user with opportunities to invest those surplus funds into one or more predefined investment vehicles.

In addition, one preferred method for creating excess funds from retail transactions and apportioning those funds into investments can include queuing up surplus funds that rounds-up some or all of a consumer's transaction to the nearest dollar (Single Account Virtual Aggregation); transferring the aggregation of surplus funds into a surplus account when a defined threshold is met (Threshold Triggered Single User ACH); pooling all of the transfers from all system users such that they are invested into one or more investments (Batch User Aggregation For Investing). As described below, the preferred method can further include displaying a user's actual and pending round-ups, for review and further investment by the user (Scrolling Timeline of Round-ups). Other variations, features, and aspects of the system and method of the preferred embodiment are described in detail below with reference to the appended drawings.

An illustration of the invention is helpful at this point: Assume a user makes a single credit card purchase every day (say $4.15 on her morning coffee), the present invention will—based on the user's prior authorization—round up the transaction to $5.00, and account for the transaction in two categories: (1) a $4.15 charge on the user's credit-card; and (2) a $0.85 virtual charge to be made at a later date (i.e. it will be placed in the "Digital Queue"). Once all the virtual charges in the Digital Queue reaches a user-defined minimum threshold (say $5.00), then the invention will automatically charge the user $5.10 on the sixth day. This amount, as well as the amount for all other users of the invention, will be placed into an omnibus account (likely managed by the operators of the invention), and then periodically invested into one or more pre-defined investments (e.g., savings account, qualified index or mutual funds, etc.). Each user of the invention will receive his-own or her-own pro-rata share of the investment. Further, the user will have real-time access to each purchase made, their respective Digital Queue, past round-ups transferred into the investment account (both by transaction and aggregated transfers), as well as their individual investment portfolio.

Other variations, features, and aspects of the system and method of the preferred embodiment are described in detail below with reference to the appended drawings.

The preferred embodiments of the present invention may also be used with a pre-paid credit cards and/or Point of Sales (POS) terminal for consumer transactions. Because certain users have opted into alternate payment methods, such as contactless (e.g., radio) and direct (e.g., electrical conduction) transactions/data exchange methodologies, the instant invention may be readily adapted to conform to such. Such methodologies may include, for example, near field communication (NFC) device readers, credit/debit card readers, smart card readers, radio frequency identification (RFID) tag readers, and so on. Thus, the present invention could be used independently (by reading transactions from banks, credit card companies, or investment firms) or in the alternative, the present invention could also be interfaced with, and used in conjunction with, POS transactions. An example of such systems and methods is described in U.S. patent application Ser. No. 13/66,499, entitled "Systems And Methods For Managing Consumer Transaction-Based Investments," to Cruttenden et al, which is hereby incorporated by reference in its entirety ("Cruttenden Application").

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 3 is an example the computerized screen that explains the sign-up process as found on the preferred embodiment of present invention.

DEFINITIONS

Figure 1:
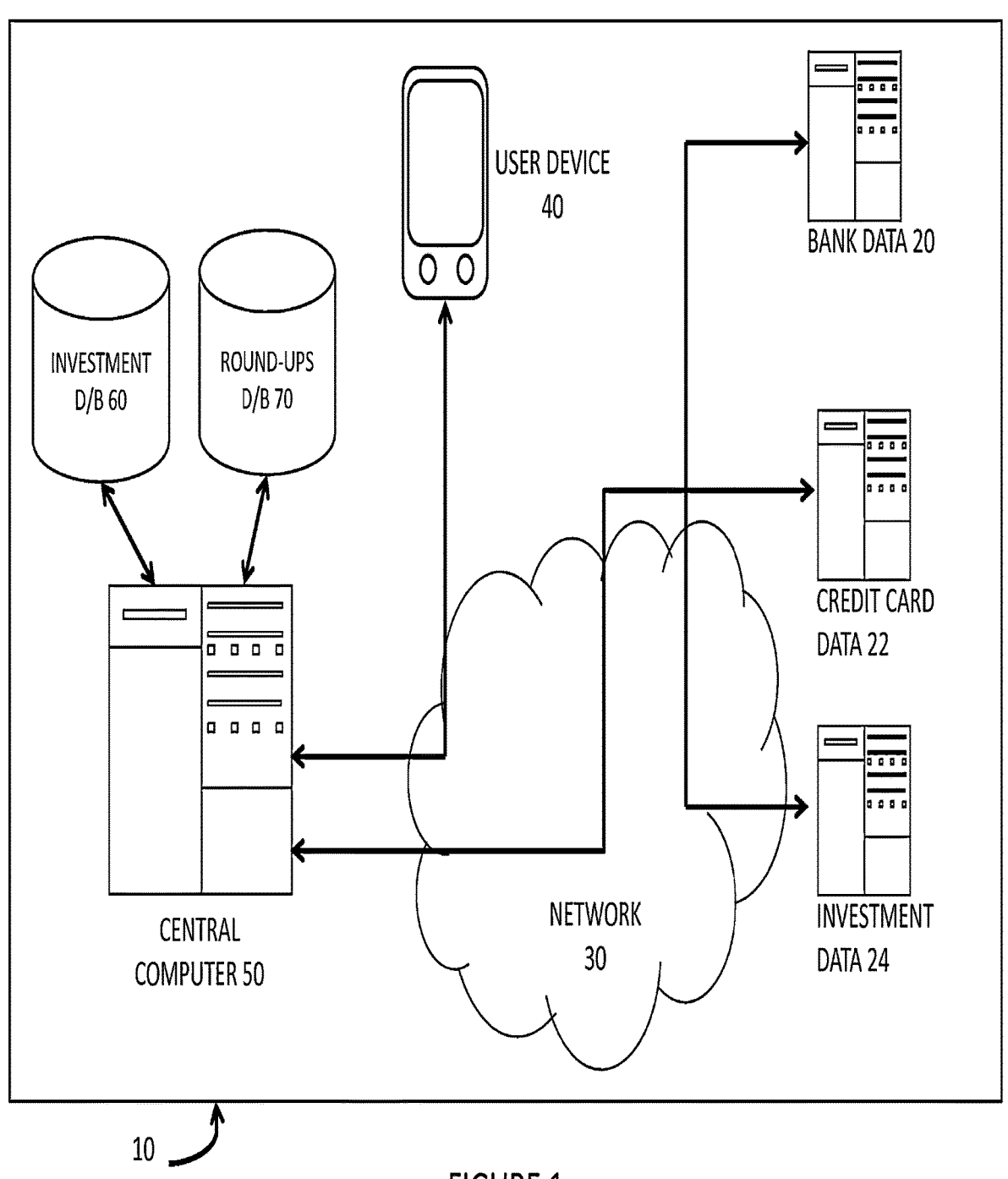
FIG. 1 is a schematic block diagram of a system used in connection with creating excess funds from retail transactions and apportioning those funds into investments in accordance with a preferred embodiment of the present invention.

The following definitions are not intended to alter the plain and ordinary meaning of the terms below but are instead intended to aid the reader in explaining the inventive concepts below:

As used herein, the term "USER DEVICE" shall generally refer to a desktop computer, laptop computer, notebook computer, tablet computer, mobile device such as a smart phone or personal digital assistant, smart TV, gaming console, streaming video player, or any other, suitable networking device having a web browser and/or stand-alone application configured to interface with and/or receive any or all data to/from the CENTRAL COMPUTER and/or one or more components of the preferred system 10. The user device shall be considered in its broadest form, with any method of user input, including without limitation, touch, voice, gesture, vision, or other sensory user input.

As used herein, the term "CENTRAL COMPUTER" shall generally refer to one or more sub-components or machines configured for receiving, manipulating, configuring, analyzing, synthesizing, communicating, and/or processing data associated with the user, the user's bank information, the user's credit card information, and/or the user's investment information. Any of the foregoing subcomponents or machines can optionally be integrated into a single operating unit, or distributed throughout multiple hardware entities through networked or cloud-based resources. Moreover, the central computer may be configured to interface with and/or receive any or all data to/from the USER DEVICE and/or one or more components of the preferred system 10.

As used herein, the term "BANK DATA" shall generally refer to data acquired by data stores (including without limitation, through feeds, databases, or files containing data), related to the user, and that contain a user's banking information. Bank data may be furnished by a banking institution (such as Bank of America or Wells Fargo), the bank's designated data host, an authorized third-party data aggregator (such as Intuit or Yodlee), and/or the user himself/herself/itself. An example of bank data is a ledger of individual transactions in a bank account (including without limitation, deposit accounts, money market accounts, certificate of deposit accounts, and the like). Another example is the account data from credit unions (such as the Navy Federal Credit Union), savings and loan institutions, or other comparable financial institutions which offers banking services to consumers. These data stores are anticipated to contain numerous records related to a person's financial accounts, such as records of deposits, checks cashed, debit card transactions related to consumer purchases, and/or funds transferred. Bank data may further include personally identifying information such as social security numbers, driver's license number, and the like.

As used herein, the term "CREDIT CARD DATA" shall generally refer to data stores (including without limitation, through feeds, databases, or files containing data), related to the user, and that contain a user's borrowing and or credit account information. Credit card data may be furnished by a lending institution that offers revolving or prepaid credit in the form of a credit card (e.g. institutions that offer Visa, MasterCard, American Express, dinner's clubs, or retailer specific credit accounts, such as Macy's, Guitar Center, etc.), the lending institution's designated data host, an authorized third-party data aggregator (such as Intuit or Yodlee), and/or the user himself/herself/itself. These data stores are anticipated to contain numerous records related to a person's spending accounts, including without limitation, consumer purchases, interest expenses, fees, funds transfers, and outstanding balances. Credit card data may further include personally identifying information such as social security numbers, driver's license number, and the like.

As used herein, the term "INVESTMENT DATA" shall generally refer to data stores (including without limitation, through feeds, databases, or files containing data), related to the user, and that contain a user's investment information. Investment data may be furnished by an investing institution, the investing institution's designated data host, an authorized third-party data aggregator (such as Intuit or Yodlee), and/or the user himself/herself/itself. Investment institutions are contemplated in their broadest sense, and may include brokerage firms (e.g. J.P. Morgan or UBS), banks, insurance companies, retirement or pension funds, hedge funds, mutual funds, and/or domestic/foreign equivalents. Example of investment data generally include ledgers of individual transactions in an investment account. These data stores are anticipated to contain numerous records related to a person's investments, and may generally include information related to purchases and sales of financial securities, commodities, forex, and the like. Investment data may further include personally identifying information such as social security numbers, driver's license number, etc.

As used herein, the term "FINANCIAL DATASETS" shall generally refer to BANK DATA, CREDIT CARD DATA, and INVESTMENT DATA, individually, collectively, or in one or more combinations. Financial datasets preferably function to accumulate, store, maintain, and/or make available financial data relating to the user. Additionally, the financial datasets can include any information for any or all account holders on a user's banking, credit card, and investment accounts, thereby encompassing one or more degrees of separation between the user and the data extracted from the investment data (e.g., joint accounts, family trusts, corporations, etc.). The financial datasets may be available for free or at a cost through direct or indirect access to one or more institutions.

As used herein, the term "USER'S CREDENTIALS" shall generally refer to the user's data required to authenticate the user, in the USER DEVICE, CENTRAL COMPUTER, and/or to access external data stores, such as found in the FINANCIAL DATASETS. By way of example, these credentials may include the user's social security number, driver's license number, date of birth, financial institution specific usernames and passwords, pin numbers, and/or other information requested by the institution to authenticate the user.

As used herein, the term "NETWORK" shall generally refer to any suitable combination of the global Internet, a wide area network (WAN), a local area network (LAN), and/or a near field network, as well as any suitable networking software, firmware, hardware, routers, modems, cables, transceivers, antennas, and the like. Some or all of the components of the preferred system 10 can access the network through wired or wireless means, and using any suitable communication protocol/s, layers, addresses, types of media, application programming interface/s, and/or supporting communications hardware, firmware, and/or software.

As used herein and in the claims, the singular forms "a," "an," and "the" include plural references unless the context clearly dictates otherwise.

Unless defined otherwise, all technical and scientific terms used herein have the same meanings as commonly understood by one of ordinary skill in the art.

DETAILED DESCRIPTION

The following description of the preferred embodiments of the invention is not intended to limit the invention to these preferred embodiments, but rather to enable any person skilled in the art to make and use this invention. Although any methods, materials, and devices similar or equivalent to those described herein can be used in the practice or testing of embodiments, the preferred methods, materials, and devices are now described.

The present invention relates to improved methods and systems for creating excess funds from retail transactions and apportioning those funds into investments, which is most suitable for use with individuals, and shall be described as such throughout this document. Notwithstanding, the present invention may also be used by other types of entities including, but not limited to, corporations, companies, small businesses, and trusts, and/or any other recognized legal entities.

System

As shown in FIG. 1, a preferred operating environment for creating excess funds from retail transactions and apportioning those funds into investments in accordance with a preferred embodiment can generally include a USER DEVICE 40, a CENTRAL COMPUTER 50, a NETWORK 30, and one or more data sources, including for example BANK DATA 20, CREDIT CARD DATA 22, and INVESTMENT DATA 24 (i.e. the FINANCIAL DATASETS). In addition, the preferred system 10 can store information from the FINANCIAL DATASETS in one or more databases, including for example, INVESTMENT D/B 60 and ROUND-UPS D/B 70. These databases may be populated by manual input by the user or a system operator, or preferably by automated downloads from external data sources.

The preferred system 10 can include at least a CENTRAL COMPUTER 50 and/or a USER DEVICE 40, which (individually or collectively) function to provide users a continuous opportunity for saving and investment by (a) rounding up individual transactions to the nearest dollar; (b) placing those discrete savings into a Digital Queue; and (c) participating in qualified aggregate investments offered directly or indirectly through the invention, all based on a novel and unique set of processes and from a plurality of user choices. Moreover, the preferred system 10 functions to provide the user with real-time access to each consumer transaction made (whether past or present), past round-ups transferred into the investment account (both by transaction and aggregated transfers), their respective Digital Queue for future investment, as well as investment portfolio based on the novel and unique methodology described below.

In other words, this invention relates to the preferred methodology for creating excess funds from retail transactions and apportioning those funds into investments that takes place within the CENTRAL COMPUTER 50 and/or a USER DEVICE 40, after all FINANCIAL DATASETS are temporarily gathered or otherwise downloaded from the CENTRAL COMPUTER 50, USER DEVICE 40, and/or one or more data sources, including for example BORROWER'S DATA 13, BANK DATA 20, CREDIT CARD DATA 22, and INVESTMENT DATA 24.

Example User Interface

Figure 2:
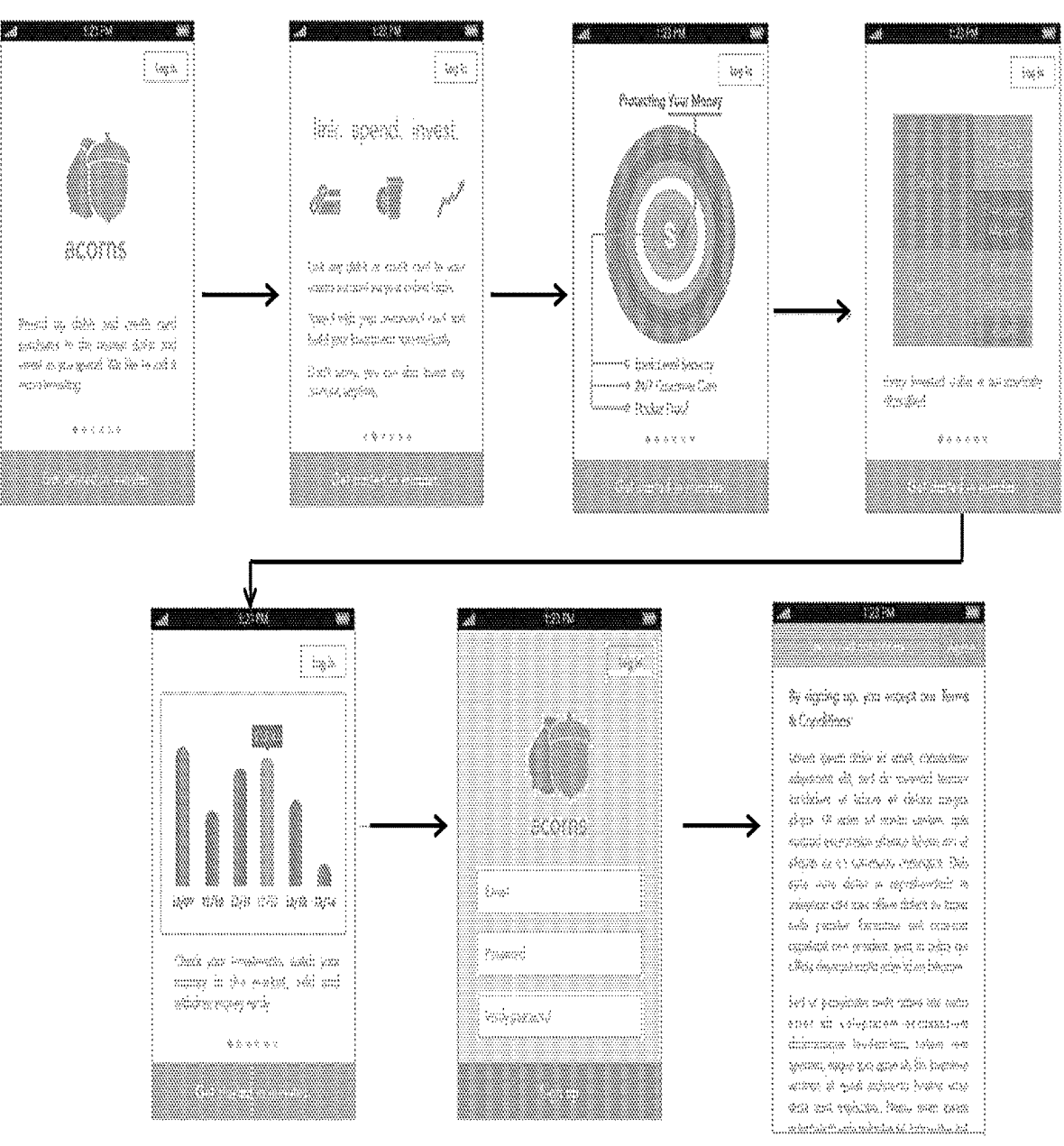
FIG. 2 is an example the computerized screen of the benefits of the invention as explained to a prospective user as found on the preferred embodiment of present invention.

FIG. 2 is an example of the initial computerized screens (user interfaces) as found on the preferred embodiment of present invention, wherein a new user is given a brief tutorial of the benefits of the invention. Color of action buttons change from blue to green when all required fields are appropriately completed (not shown). Returning users may bypass this initial sequence, and simply enter a user name (email), password, and/or four-digit passcode (not shown). The preferred embodiment of the present invention, may further include a screen requiring the user to agree to terms and conditions before signing up (placeholder shown).

Figure 3:
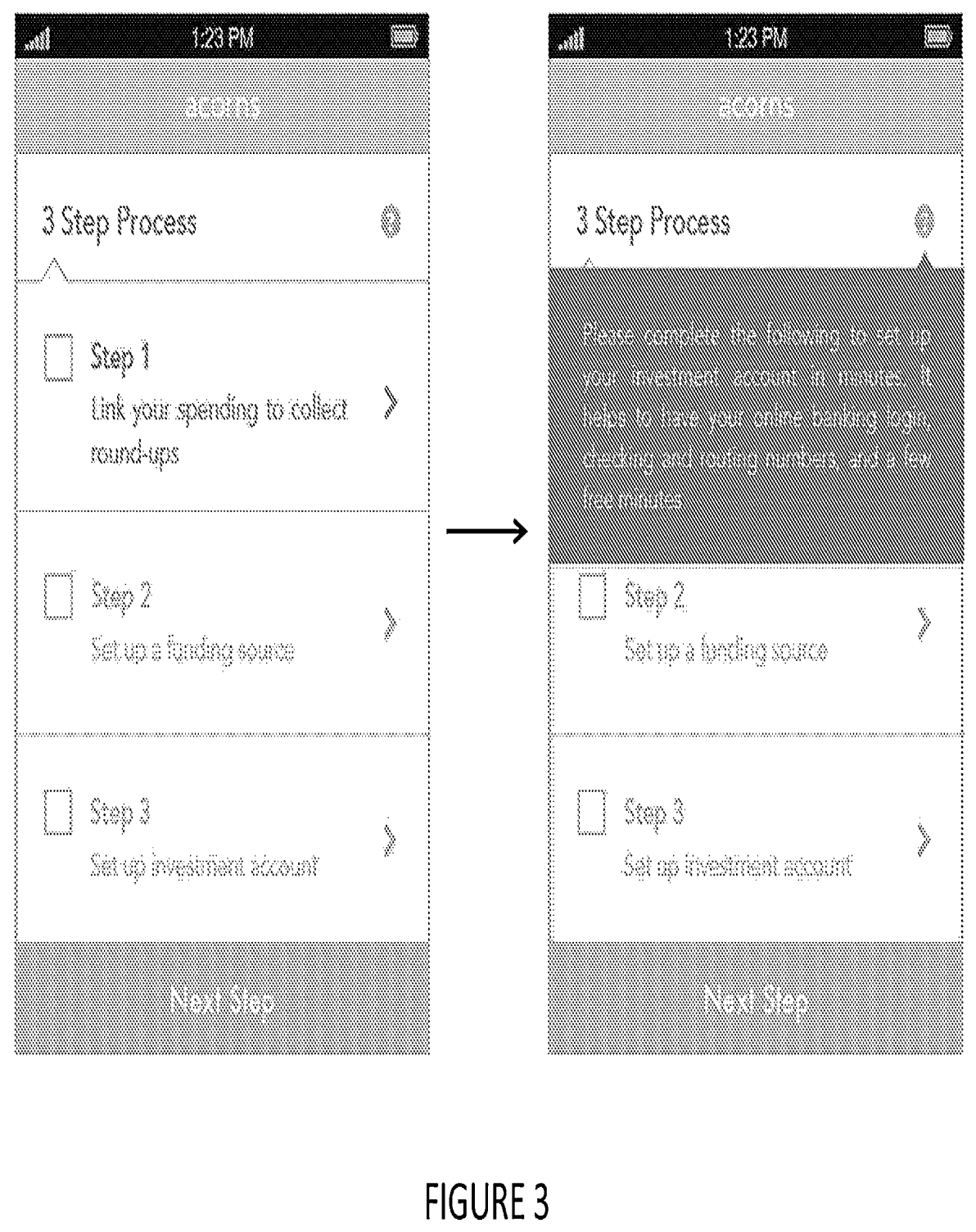

FIG. 3 is an example of the computerized screens (user interfaces) as found on the preferred embodiment of present invention, wherein the user is given a three step overview of the sign-up process: (1) linking a spending account to collect round-ups (i.e. a credit or debit account); (2) setting up a funding source (i.e. a deposit account); and (3) setting up an investment account. Unless otherwise indicated below, the registration is performed step-by-step wherein users are not allowed to skip any steps, or perform the steps out of sequence. Relevant error and informational screens are intermittently displayed throughout the sign-up process as needed and/or required (not shown).

Figure 4:
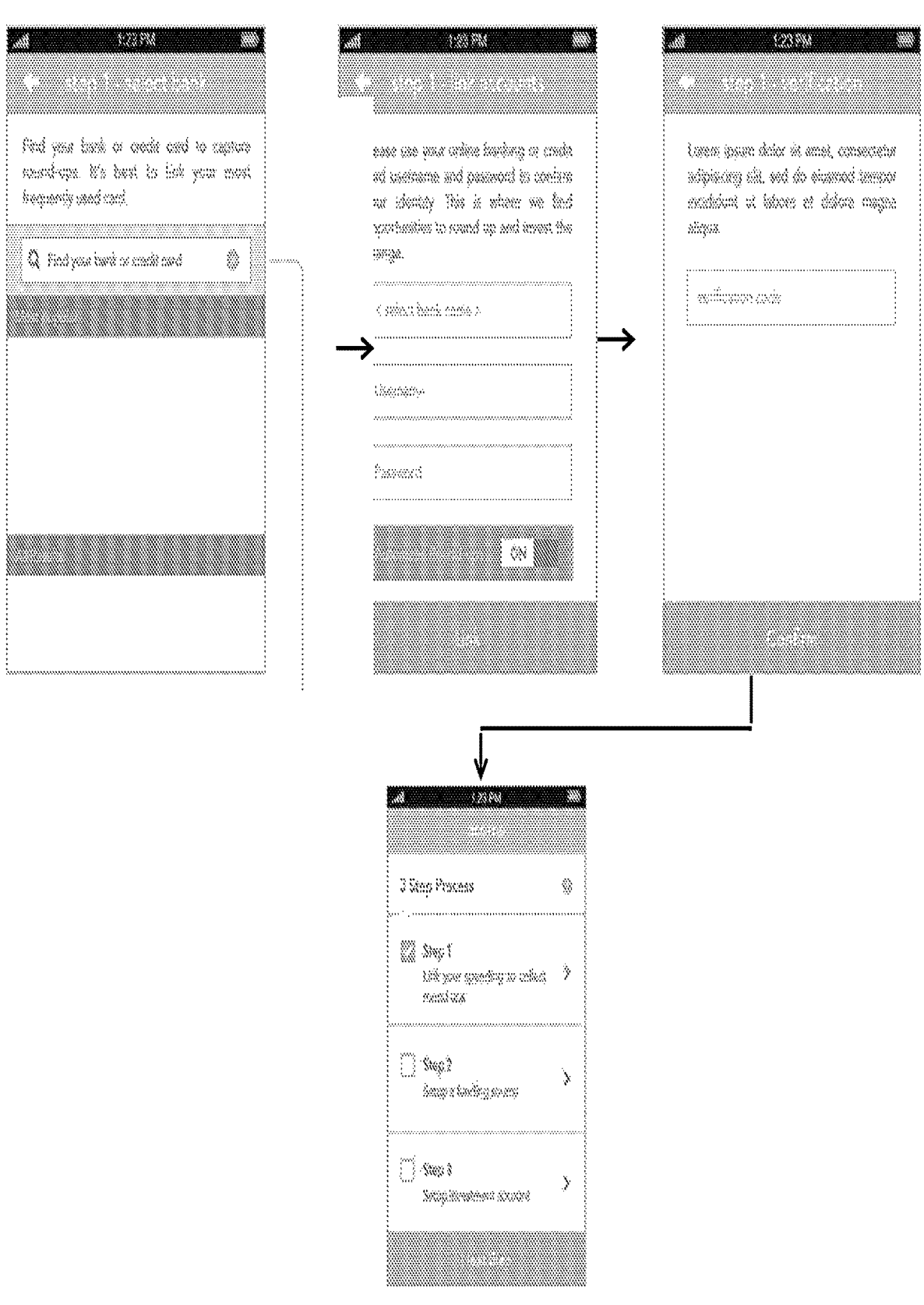
FIG. 4 is an example the computerized screen of step 1 of the sign up-process (i.e. linking a spending account to collect round-ups) as found on the preferred embodiment of present invention.

FIG. 4 is an example of the computerized screens as found on the preferred embodiment of present invention, wherein the user is guided through step 1: linking a spending account to collect round-ups (i.e. a spending account, namely a debit or credit card account). In this step, the user selects his or her lender's name (results may be automatically displayed) as well as the USER'S CREDENTIALS (i.e. log-on credentials for that lending institution).

Moreover, to the extent that a lending institution requires a third credential (i.e. verification codes and/or pin number), a user is afforded the opportunity to input that as well. Finally, once the USER'S CREDENTIALS are verified, the user is provided a final confirmation screen. The preferred embodiment of present invention may be linked to additional spending accounts in later set-up screens (not shown).

Figure 5:
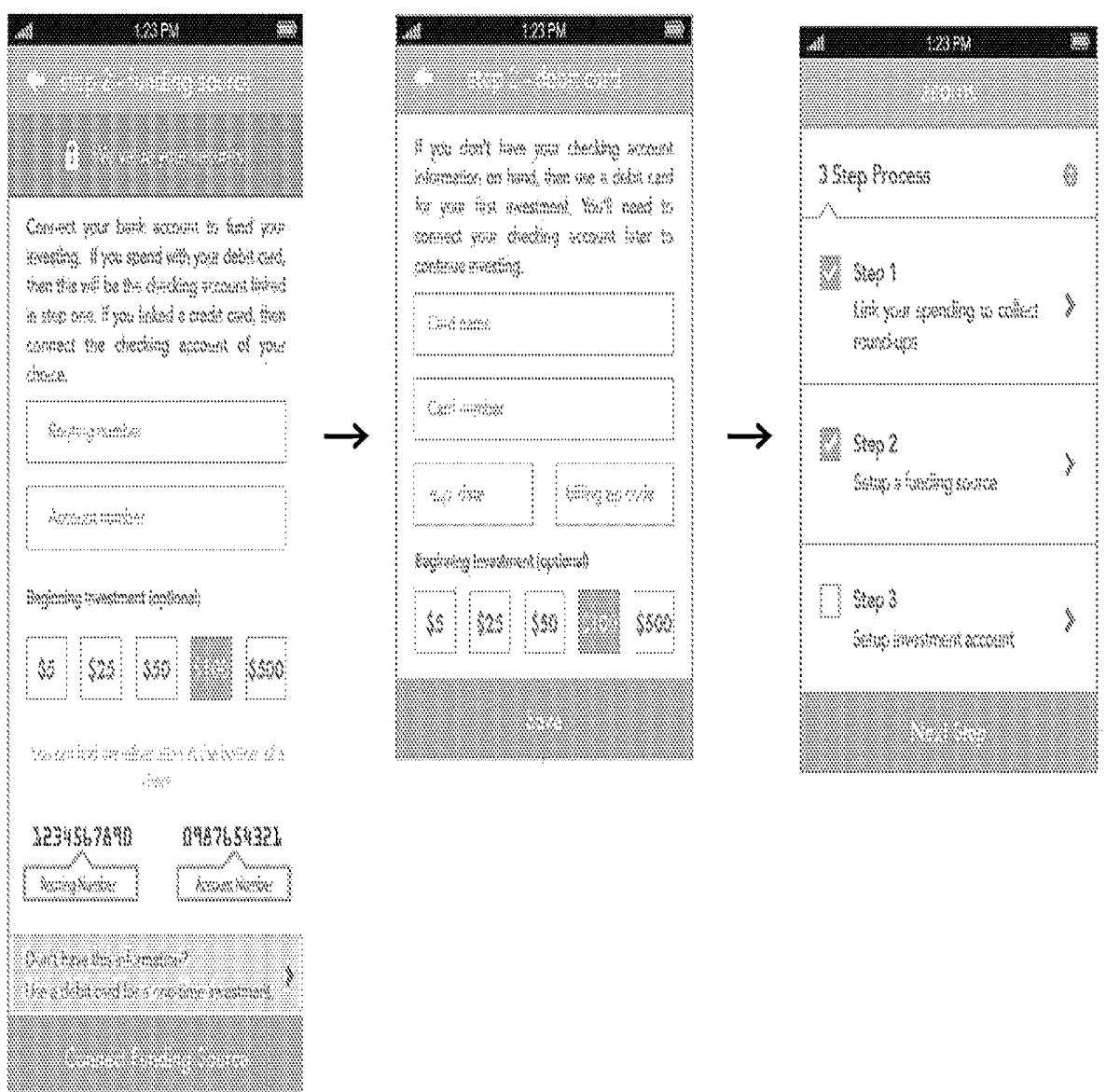
FIG. 5 is an example the computerized screen of step 2 of the sign up-process (i.e. setting up a funding source) as found on the preferred embodiment of present invention.

FIG. 5 is an example the computerized screens as found on the preferred embodiment of present invention, wherein the user is guided through step 2: setting up a funding source (i.e. a deposit account). In this step, the user inputs the account number and routing number to a valid checking account. Moreover, the user is likewise prompted to input his or her debit card information (name on card, card number, expiration date, and billing zip code). To the extent that this information is duplicative of step 1 (i.e. the spending account is a debit card linked to a checking account), this second step may be skipped. In addition, the user is given the opportunity to fund his or her account in the amount of $0 to $500, from a debit card or withdrawal from a checking account. Finally, once the USER'S CREDENTIALS are verified, the user is provided a final confirmation screen. The preferred embodiment of present invention may be linked to additional funding sources in later set-up screens (not shown).

Figure 6:
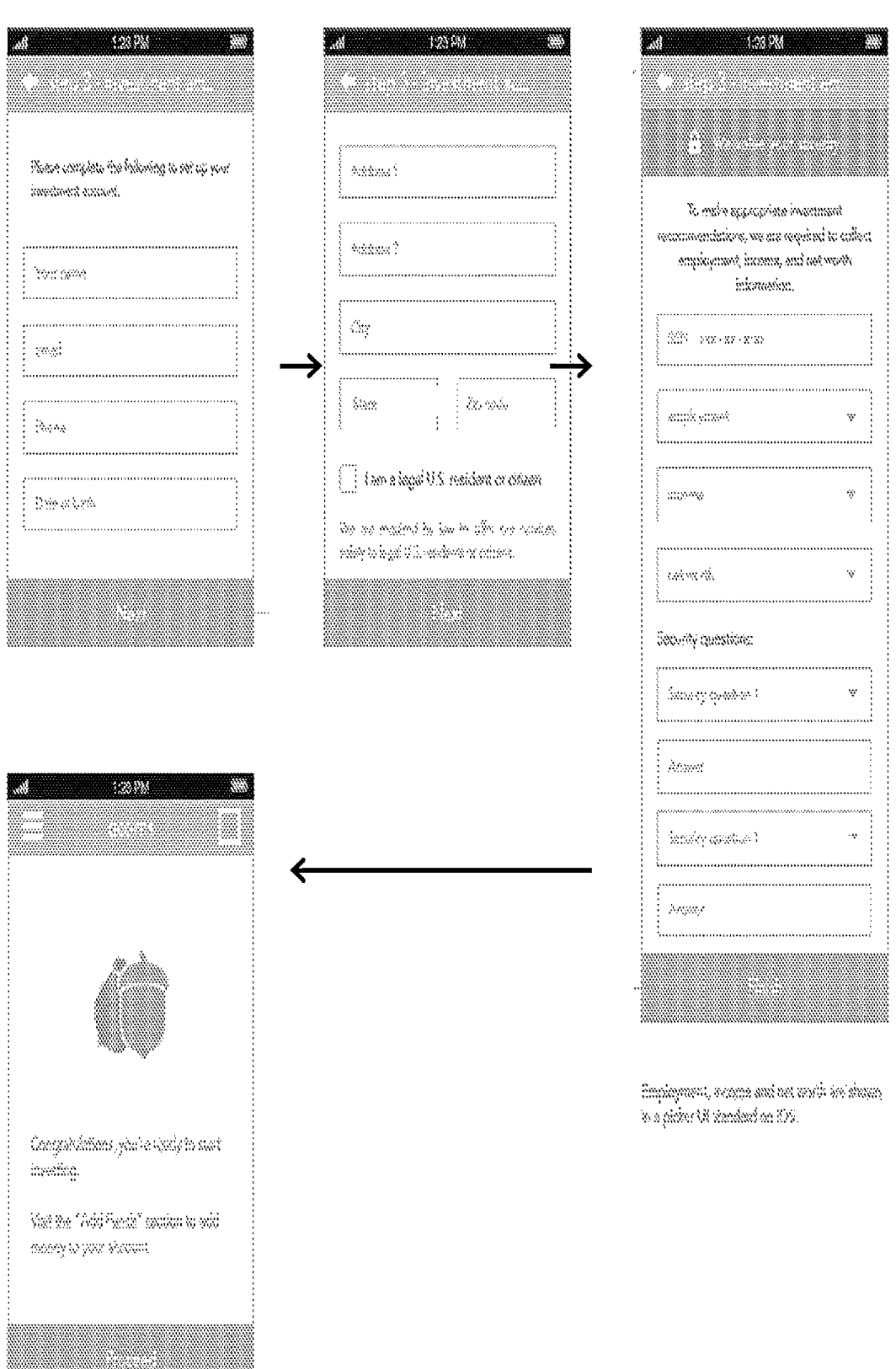
FIG. 6 is an example the computerized screen of step 3 of the sign up-process (i.e. setting up an investment account) as found on the preferred embodiment of present invention.

FIG. 6 is an example of the computerized screens as found on the preferred embodiment of present invention, wherein the user is guided through step 3: setting up an investment account. In this step, the user inputs certain personal information, including without limitation, his/her name, contact information, date of birth, social security number, and other pertinent details. Finally, once the user's fulfills such information, the user is provided a final confirmation screen. The preferred embodiment of present invention may be linked to additional investment accounts in later set-up screens (not shown).

Figure 7:
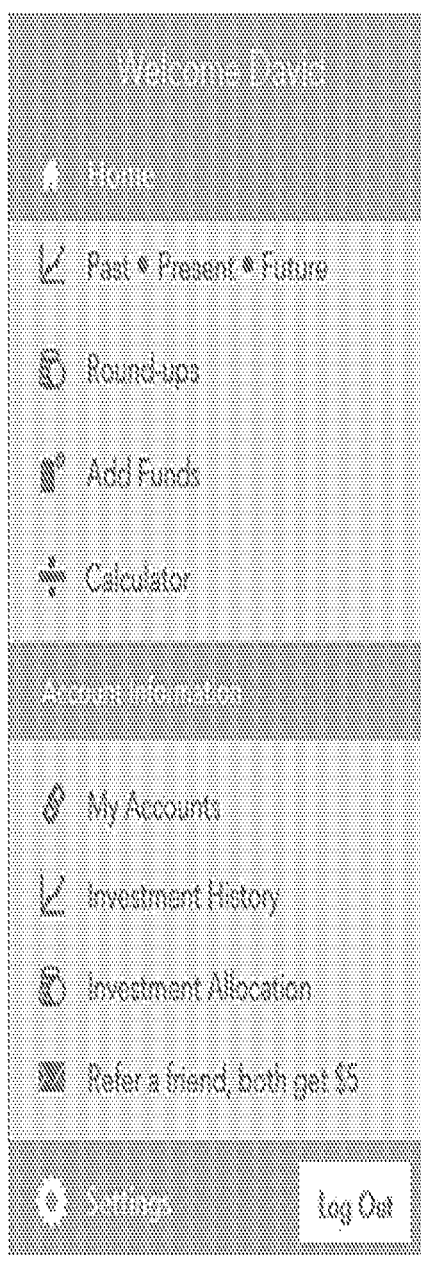
FIG. 7 is an example the computerized screen of a user's menu as found on the preferred embodiment of present invention.

FIG. 7 is an example of a computerized screen as found on the preferred embodiment of present invention, wherein the user's menu screen and options are shown. Specifically, the menu screen provides a gateway to the user's account home page, investment status page (identified as Past-Present-Future), round-ups transactional ledger, add funds screen, and investment calculator. In addition, the user are a number of links that provide the user access to his/her accounts, investment history, investment allocations, referral programs. Finally the menu screen allows the user to adjust his/her application's settings as well as logout.

Figure 8:
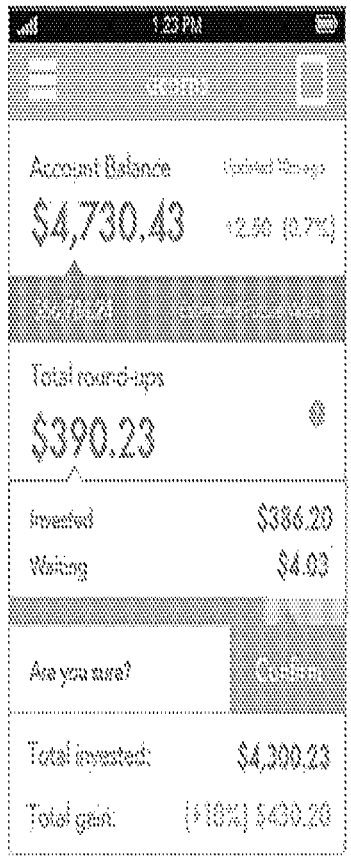
FIG. 8 is an example the computerized screen of a user's home page as found on the preferred embodiment of present invention.
Figure 8:

FIG. 8 is an example of the computerized screens as found on the preferred embodiment of present invention, wherein the home screen is provides information related to the user's account balance (current value, estimated future value, and recent changes), total round-ups (invested and "waiting" to be transferred from the Digital Queue), and total investment gain.

In addition, the home screen provides the user the option of immediately adding funds sufficient to meet the threshold to invest.

Figure 9:
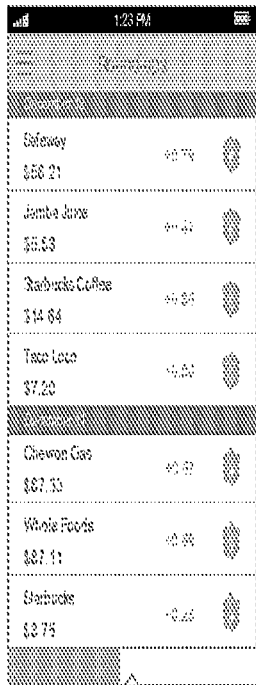
FIG. 9 is an example the computerized screen of a user's interface showing a summary of round-ups as found on the preferred embodiment of present invention.
Figure 9:
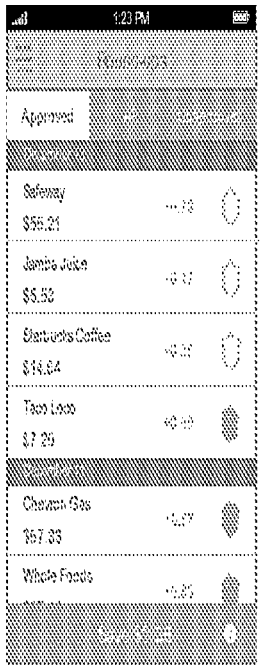
Figure 9:
Figure 9:
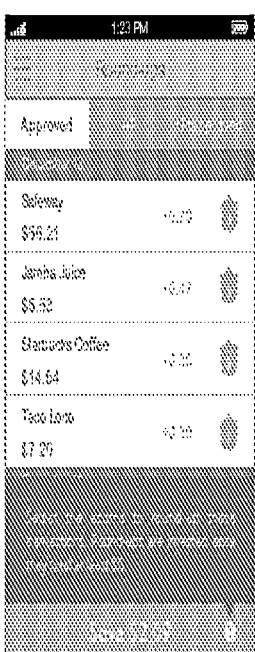

FIG. 9 is an example of four computerized screens as found on the preferred embodiment of present invention, wherein the user is provided discrete details related to his/her current and past purchases (e.g., restaurants, cafes, retailers, etc.), and the relevant round-up amount(s) related thereto. The user is further provided a color-coded icon adjacent to the round-up amount to indicate whether the round up is new, approved for transfer, committed to an investment, invested, or otherwise rewarded (rewards are typically provided by the invention operator for marketing purposes, such as successful referrals and/or other milestones achieved). Moreover, when a user decides that a round-up will take place manually, the user is given discretion to approve or disapprove a specific round-up from occurring, all before a transfer to an investment account takes place. Depending on the quantity of transactions, users may scroll through a graphs or a list of data, view such on multiple pages, or filter results based on certain metrics, such as date ranges, transaction amounts, vendor types, or vendor names (not shown). Transactional histories may be refreshed manually (e.g., depressing a button, gesturing such as by "pulling down" a menu, etc.) or automatically (e.g., opening the application, scheduled downloads, or by push alert), as is most suitable to the USER DEVICE or as configured by the user in a subsequent setting screen (not shown).

Figure 10:
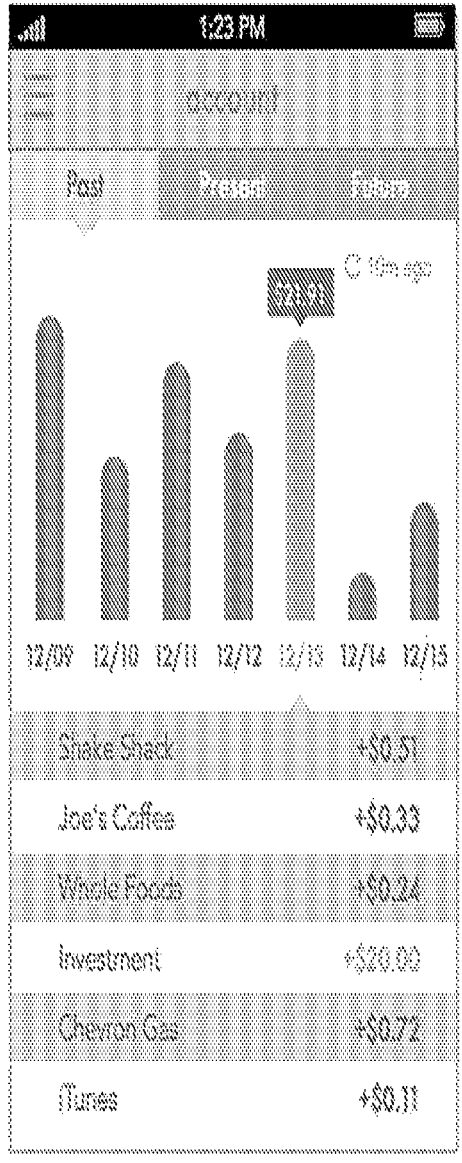
FIG. 10 is an example the computerized screen of a user's interface showing a detailed information related to the round-ups as found on the preferred embodiment of present invention.
Figure 10:
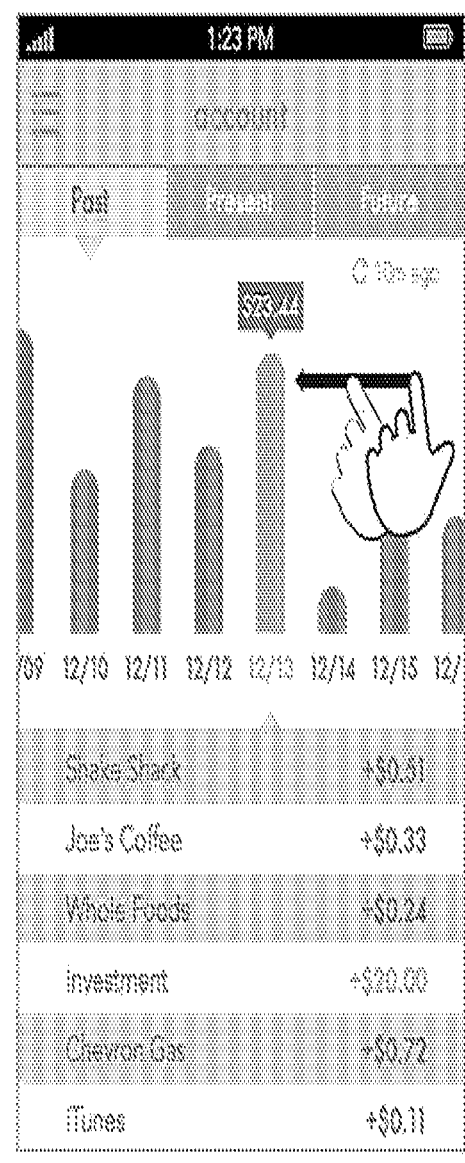

FIG. 10 is an example of two computerized screens as found on the preferred embodiment of present invention, wherein the user is given a tabular as well as graphical representation of his/her round-ups in the past, present, as well as those predicted in the future. Future expenses may be based on purchasing behavior and/or based on user-inputted transactions, whether recurring or singular in nature. Depending on the quantity of transactions, users may scroll through a graphs or a list of data, view such on multiple pages, or filter results based on certain metrics, such as date ranges, transaction amounts, vendor types, or vendor names (not shown). Transactional histories may be refreshed manually (e.g., depressing a button, gesturing such as by "swiping," etc.) or automatically (e.g., opening the application, scheduled downloads, or by a data "push," etc.), as is most suitable to the USER DEVICE or as configured by the user in a subsequent setting screen (not shown).

Figure 11:
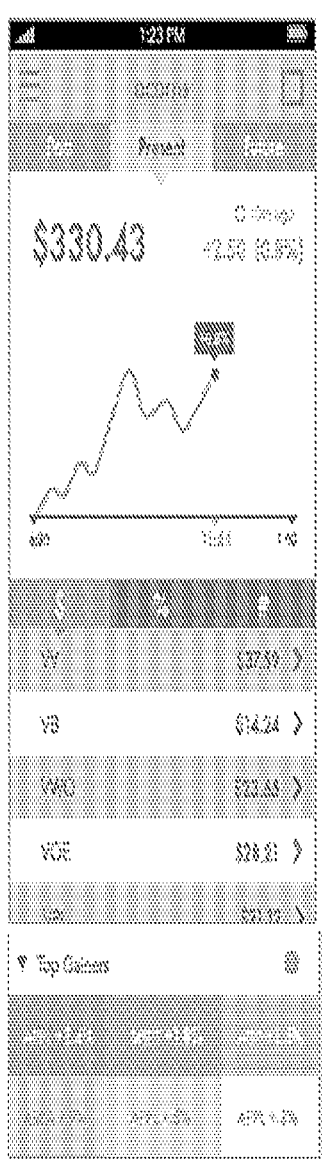
FIG. 11 is an example the computerized screen of a user's investments pages as found on the preferred embodiment of present invention.
Figure 11:
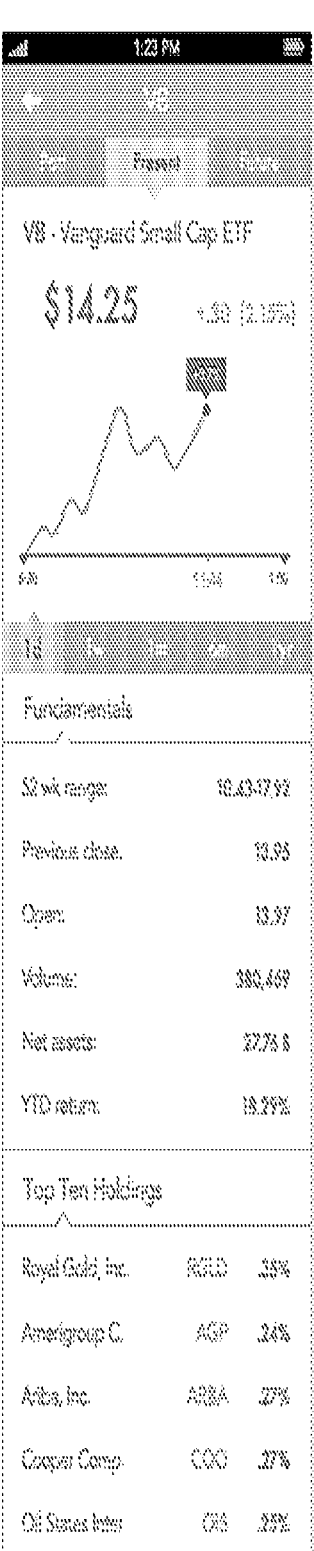

FIG. 11 is an example of three computerized screen as found on the preferred embodiment of present invention, wherein the user is given a tabular as well as graphical representation of his/her portfolio of investments. The user may view detailed information related to a specific investment, or review information related to other qualified investments available, as well as view market indexes (Dow, S&P, etc.). Moreover, gains are color coded in green, and losses in red. Depending on the gravity of the gain or loss, the shades of green and red increase/decrease correspondingly.

Figure 12:
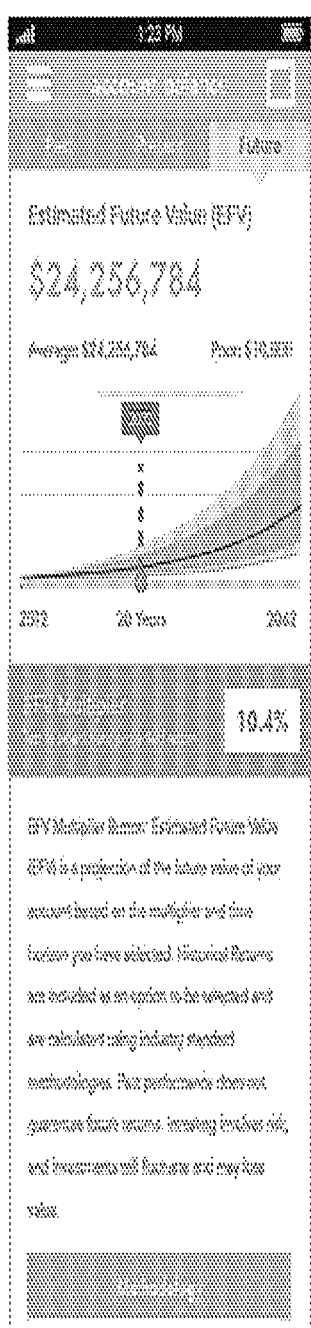
FIG. 12 is an example the computerized screen of a user's estimated future value page as found on the preferred embodiment of present invention.
Figure 12:
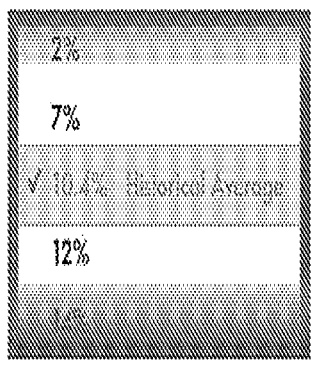
Figure 12:
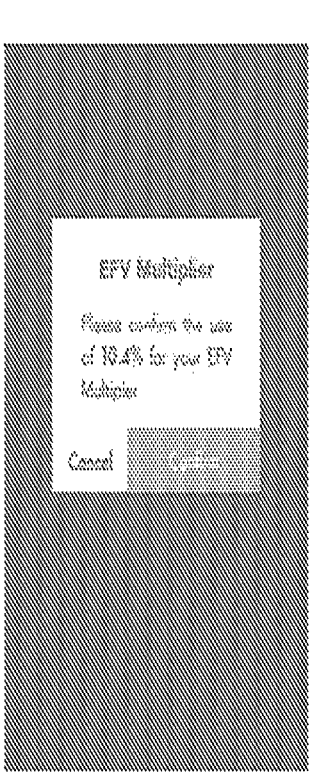

FIG. 12 is an example of a computerized screen as found on the preferred embodiment of present invention, wherein the user is shown, both in numerical as well as graphical formats, the estimated value of his/her investments over time. The user may change his/her assumptions, as well as given a synopsis of how the estimated future values are derived (sample estimated future value option and confirmation screens also shown).

Figure 13:
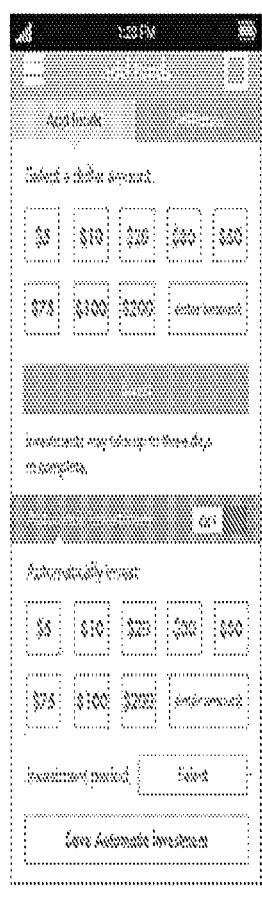
FIG. 13 is an example the computerized screen of a user's add-funds pages as found on the preferred embodiment of present invention.
Figure 13:
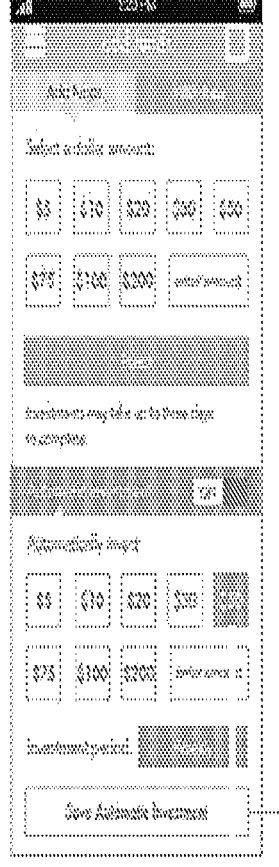
Figure 13:
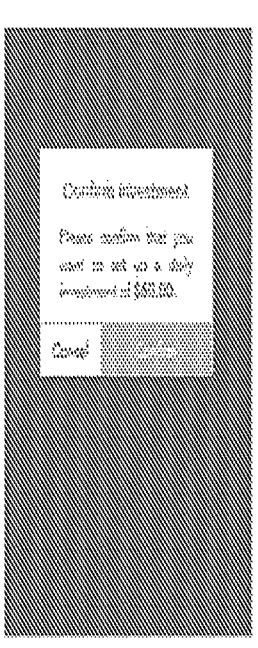

FIG. 13 is an example several computerized screens as found on the preferred embodiment of present invention, wherein the user is afforded the opportunity to make either a one-time investment or automatic periodic investments (daily, weekly, monthly, etc.). The user may investment pre-selected or user-defined amounts into his/her investment account. In the preferred embodiment, a user is always given a final opportunity to confirm additions to his/her investment account.

Figure 14:
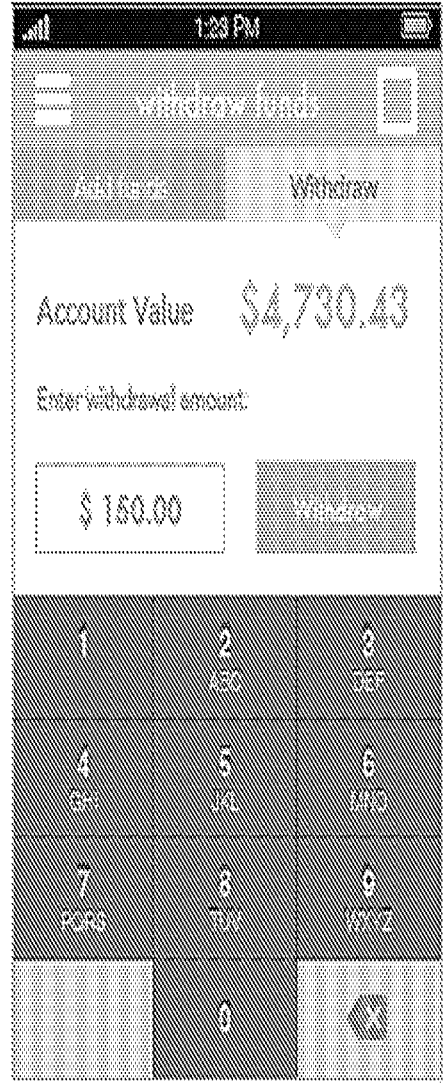
FIG. 14 is an example the computerized screen of a user's withdraw-funds pages as found on the preferred embodiment of present invention.
Figure 14:
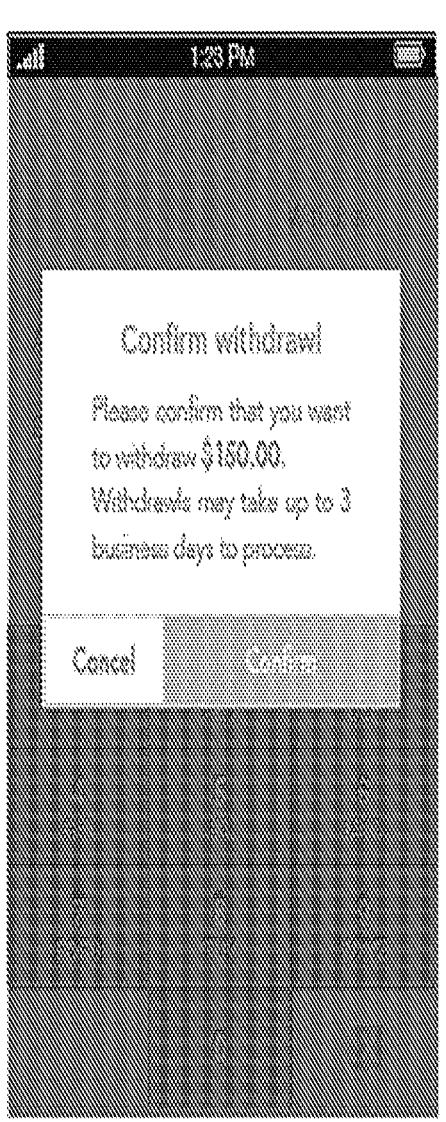

FIG. 14 is an example of two computerized screens as found on the preferred embodiment of present invention, wherein the user is afforded the opportunity to make user-defined withdrawals from his/her investment accounts. In the preferred embodiment, a user is always given a final opportunity to confirm withdrawals from his/her investment account.

Example Process

For the purposes of this disclosure, it is assumed that the user has already signed-up to use the system (established user names, passwords, etc.), as well as connected his/her FINANCIAL DATASETS (i.e. BANK DATA, CREDIT CARD DATA, INVESTMENT DATA, etc.) on the relevant application on the USER DEVICE, including by inputting any relevant USER DATA. These steps, while important, are sufficiently described in the "Preferred User Interface" section supra as well as FIGS. 2-6. Accompanying methodologies to (a) establish a USER'S CREDENTIALS and (b) connect to external data stores (e.g., via proprietary database connectors), while varied, are well known and appreciated by those with ordinary skill in the art, and thus, will not be described herein.

Figure 15:
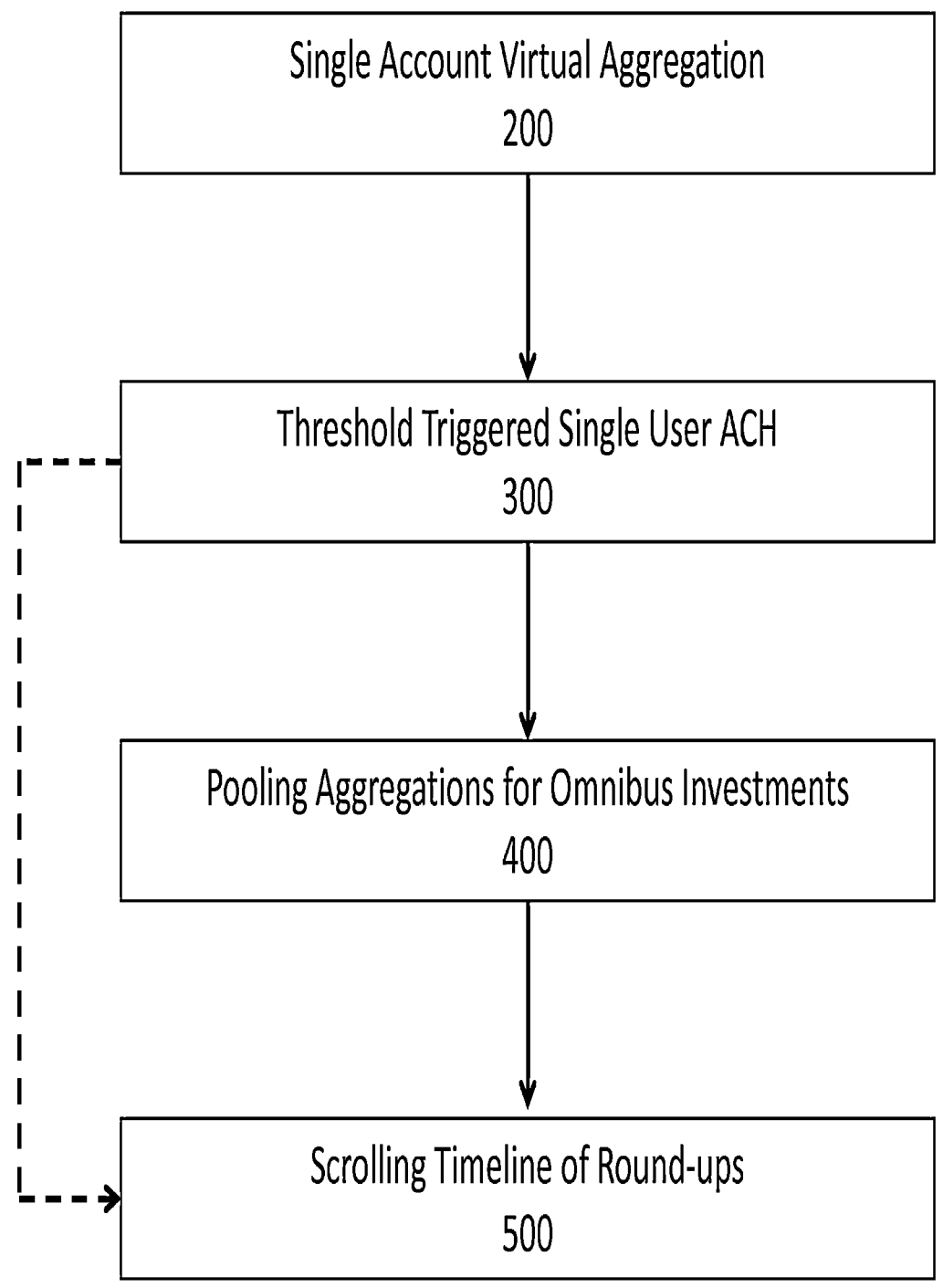
FIG. 15 depicts an overall flowchart illustrating an exemplary embodiment of a method by which excess funds from retail transactions are apportioning into investments.

As shown in FIG. 15, the preferred method for creating excess funds from retail transactions and apportioning those funds into investments involves the following steps: (a) single account virtual aggregation 200; (b) a threshold triggered single user ACH 300; (c) batch user aggregation for investing 400; and finally (d) providing the user with information related to his/her savings and investments in the form of a scrolling timeline of round-ups 500.

Figure 16:
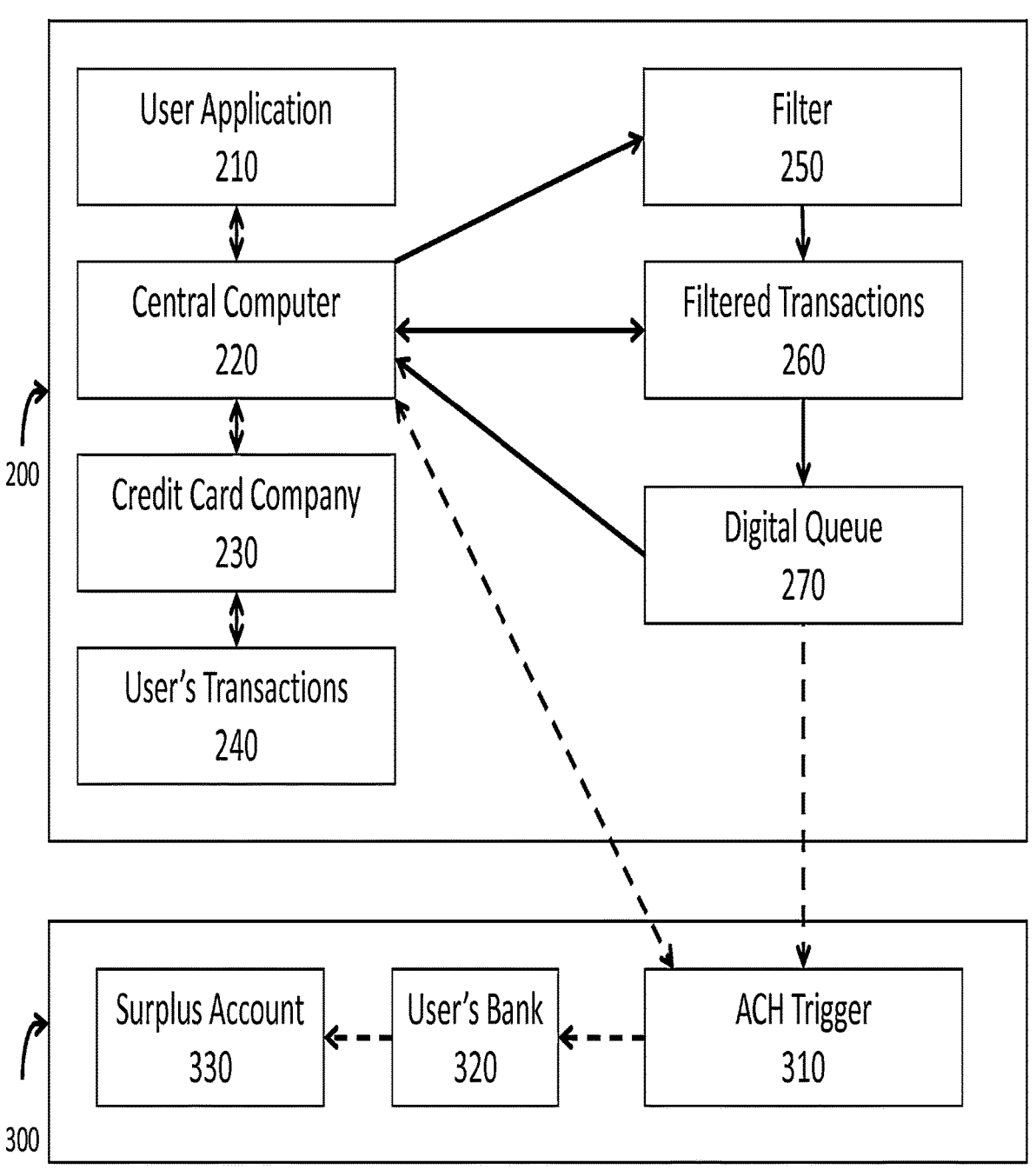
FIG. 16 depicts an overall flowchart illustrating an exemplary embodiment of a method for single account virtual aggregation and method for threshold triggered single user ACH.

As shown in FIG. 16, the preferred method for single account virtual aggregation 200 and Threshold Triggered Single User ACH 300, commences with the user authenticating himself/herself on the system from a network-enabled User Application 210 on the USER DEVICE. Through the User Application 210, the user authorizes the CENTRAL COMPUTER 220 to access data stores for the user's Credit Card Company 230, which contains records of the User's Transactions 240 (i.e. CREDIT CARD DATA). The User's Transactions 240 in a spending account are returned, usually through the user's Credit Card Company 230, to the CENTRAL COMPUTER 220, as a list of transactions. By way of example, a hypothetical Mrs. Adams's CREDIT CARD DATA might return the following ledger of transactions:

| Date | Name | Amount | Transaction Type | Category |
|---|---|---|---|---|
| Jan. 1, 2014 | Starbucks | −$ 4.15 | Debit | Coffee Shop |
| Jan. 2, 2014 | Albertson's | −$ 25.09 | Debit | Groceries |
| Jan. 2, 2014 | Check | $250.00 | Credit | Unspecified |
| Jan. 2, 2014 | Macy's | −$ 44.12 | Debit | Retail |
| Jan. 3, 2014 | Bank of America | −$ 4.00 | Debit | Bank Fee |
| Jan. 3, 2014 | Starbucks | −$ 4.15 | Debit | Coffee Shop |
| Jan. 4, 2014 | Arco | −$ 61.01 | Debit | Gasoline |
| Jan. 4, 2014 | [ ] | $ 4.00 | Debit | Bank Fee |

-continued

| Date | Name | Amount | Transaction Type | Category |
|------|------|--------|------------------|----------|
| Jan. 5, 2014 | [Operator] | −$5.00 | Debit | Refund Investment |

Most users are anticipated to use a credit card as the source of their primary spending account. However, it is important to note that a User's Transactions 240, are not necessarily limited to a Credit Card Company 230, and may be a bank (debit card spending), a prepaid charge card, proprietary credit account, rewards program or the like. In short, the source of such information is where the User's spending account(s) reside.

Because many of the User's Transactions 240 are credit transactions rather than debit transactions, the CENTRAL COMPUTER 220 may process all transactions through a Filter 250, so that those may be processed in a different fashion than debit transactions. Examples of such ledger entries might include user deposits, third party credits, bank fees, and/or transactions by the invention's operator (which could lead to indefinite loop problems during round-ups). Thus, the CENTRAL COMPUTER 220 may return an abridged list of transactions to its internal databases (i.e. the Filtered Transaction 260), which are later transmitted to the Digital Queue 270 and/or User Application 210. Continuing with Mrs. A's example above, the Filtered Transactions 260 would yield:

| Date | Name | Amount | Transaction Type | Category |
|------|------|--------|------------------|----------|
| Jan. 1, 2014 | Starbucks | −$ 4.15 | Debit | Coffee Shop |
| Jan. 2, 2014 | Albertson's | −$25.09 | Debit | Groceries |
| Jan. 2, 2014 | Macy's | −$44.12 | Debit | Retail |
| Jan. 3, 2014 | Starbucks | −$ 4.15 | Debit | Coffee Shop |
| Jan. 4, 2014 | Arco | −$61.01 | Debit | Gasoline |
| Jan. 4, 2014 | Starbucks | −$ 4.15 | Debit | Coffee Shop |

The Filter 250 could employ any number of proprietary or readily-available filtering technologies. In the preferred method, the Filter 250 might simply eliminate records where accompanying transactional metadata meets certain criteria (e.g., transaction type=credit, or category=Bank Fee). Alternatively, each vendor's name may be cross-referenced against a database residing on the CENTRAL SERVER, thereby eliminating undesirable ledger entries (e.g., name=Bank of America, or amount >$0.00).

Assuming that the user elected to automatically round-up all transactions, the list of Filtered Transactions 260 would be passed along to the Digital Queue 270 wholesale. The Digital Queue would compute the difference between the transaction amount (say $4.15) and the next dollar (say $5.00), leading to a queue of that differential amount. For Example, Mrs. Adams first transaction (Starbuck's at $4.15) would be listed in the Digital Queue 270 along with the roundup of $0.85 (i.e. the difference between $5.00 and $4.15). In other words, once the each transaction is intercepted in the CENTRAL COMPUTER 220, with undesired results omitted (a function of Filter 250 leading to Filtered Transactions 260), a process rounds-up each remaining transaction in the Filtered Transactions 260 to the next dollar amount and "sets-aside" each amount of payment that is to be transferred at a later point in time (i.e. maintained in the Digital Queue 270). All information in the Digital Queue

270, would be returned to the CENTRAL COMPUTER 220, and in turn, to the User Application 210. Continuing with the example of Mrs. Adams, her Digital Queue 270 and the data returned to the User Application 210 would appear as follows:

| Date | Name | Amount | Digital Queue | Total Amount Queued |
|------|------|--------|---------------|---------------------|
| Jan. 1, 2013 | Starbucks | −$ 4.15 | $0.85 | $0.85 |
| Jan. 2, 2013 | Albertson's | −$25.09 | $0.91 | $1.76 |
| Jan. 2, 2013 | Macy's | −$44.12 | $0.88 | $2.64 |
| Jan. 3, 2013 | Starbucks | −$ 4.15 | $0.85 | $3.49 |
| Jan. 4, 2013 | Arco | −$61.01 | $0.99 | $4.48 |
| Jan. 4, 2013 | Starbucks | −$ 4.15 | $0.85 | $5.33 |

However, if the user has elected to manually select which transactions in the Filtered Transactions 260 to round-up, then all Filtered Transactions 260 are first returned to the User Application 210 (via the CENTRAL COMPUTER 220). At which point, the user would select which transactions to round-up in the Digital Queue 270. Continuing with the example of Mrs. Adams, let's assume she decided to round-up luxury items only. Her Digital Queue 270 would appear as follows:

| Round Up? | Date | Name | Amount | Digital Queue | Total Amount Queued |
|-----------|------|------|--------|---------------|---------------------|
| YES | Jan. 1, 2013 | Starbucks | −$ 4.15 | $0.85 | $0.85 |
| NO | Jan. 2, 2013 | Albertson's | −$25.09 | — | $0.85 |
| YES | Jan. 2, 2013 | Macy's | −$44.12 | $0.88 | $1.73 |
| YES | Jan. 3, 2013 | Starbucks | −$ 4.15 | $0.85 | $2.58 |
| NO | Jan. 4, 2013 | Arco | −$11.01 | — | $2.58 |
| YES | Jan. 4, 2013 | Starbucks | −$ 4.15 | $0.85 | $3.43 |

Subsequently, these round-up amounts are queued up (i.e. aggregated) for electronic transfer into an investment fund at a later point in time, either (a) once the aggregate amount meets a threshold specified in the ACH Trigger 310 and/or (b) upon instruction by the user.

In the first condition, once the total amount queued in the Digital Queue reaches a minimum user-defined threshold set in the ACH Trigger 310, then an instruction is sent to the User's Bank 320 (i.e. containing the funding source) to transfer an amount equal to the total amount in the Digital Queue 270 into the user's Surplus Account 330. Concurrently, a corresponding amount in the Digital Queue would reduce upon confirmation of a successful transfer. By way of example, let's assume that Mrs. Adams set her trigger to $5.00. Under this scenario, the ACH Trigger 310 would transfer $5.33 on Jan. 4, 2013, if Mrs. Adams automatically rounded up all transactions (see paragraph 80, supra), and her Digital Queue would be reduced accordingly ($5.33–$5.33=$0.00). However, if she elected to manually select which transactions to round-up, then her Digital Queue 270 would remain at $3.43 on the same date (see paragraph 81, supra).

In the second condition, a user may elect to "add funds" to the Digital Queue 270 at any time, all without engaging in another retail transaction. This is ordinarily accomplished by adding an amount equal to the difference between the total amount queued in the Digital Queue 270 and the threshold limit specified in the ACH Trigger 310 (and/or CENTRAL COMPUTER 220). Such action would effectuate an ACH Trigger 310, wherein an instruction is sent to the User's Bank 320 (i.e. containing the funding source) to transfer the total amount in the Digital Queue 270 into the user's Surplus Account 330. Consider again the example of Mrs. Adams who (a) manually selected which transactions to round-up; (b) set her trigger to $5.00; and (c) thus, the total amount held in her Digital Queue 270 was $3.43 (see paragraph 81, supra).

Instead of waiting for future transactions to accrue, she could elect to immediately add $1.57 to her Digital Queue 270, and thus triggering an ACH of $5.00 from her Bank 320 to her Surplus Account 330. Thereafter, a corresponding amount would be both added and reduced from her Digital Queue 270 (i.e. $3.43+$1.57−$5.00=$0.00).

Figure 17:
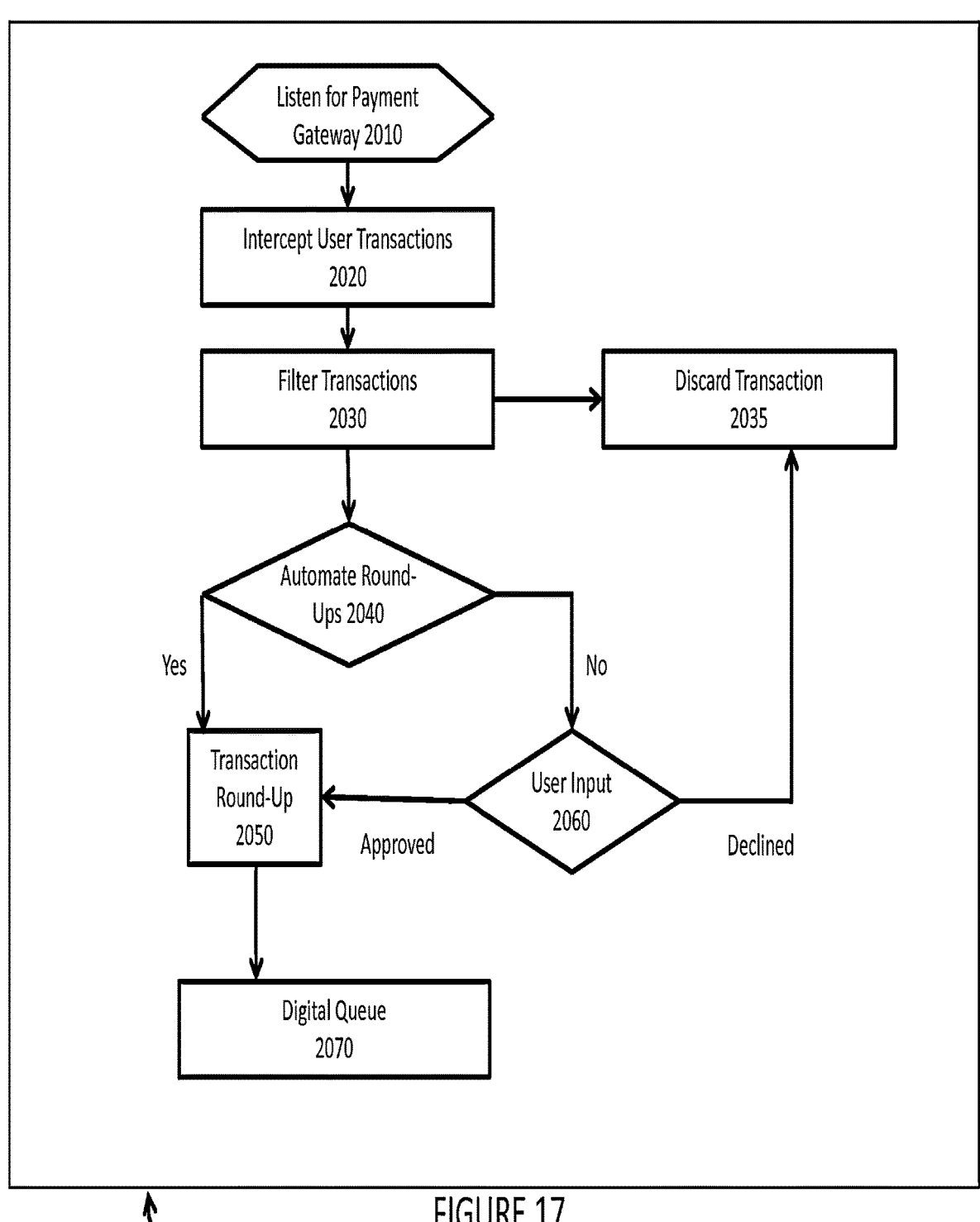
FIG. 17 depicts an additional logic flowchart illustrating an exemplary embodiment of a method for single account virtual aggregation.

As shown in FIG. 17, the preferred method for Single Account Virtual Aggregation 200, could be further explained in the logic diagram shown. Process 2000 monitors any transaction done through an approved gateway (starting block 2010) and intercepts the transmitted information (action block 2020). Each transaction is automatically filtered (action block 2030) into two categories: acceptable transactions (not shown) and discarded transactions (block 2035). If the user has automated round-ups (action block 2040), each transaction is rounded up (action block 2050), and placed in the Digital Queue 2070. If the user has not automated round-ups (action block 2040), then the user (action block 2060) must select which transaction are rounded-up (action block 2050) and placed in the Digital Queue 2070, or otherwise declined and discarded (block 2035).

Figure 18:
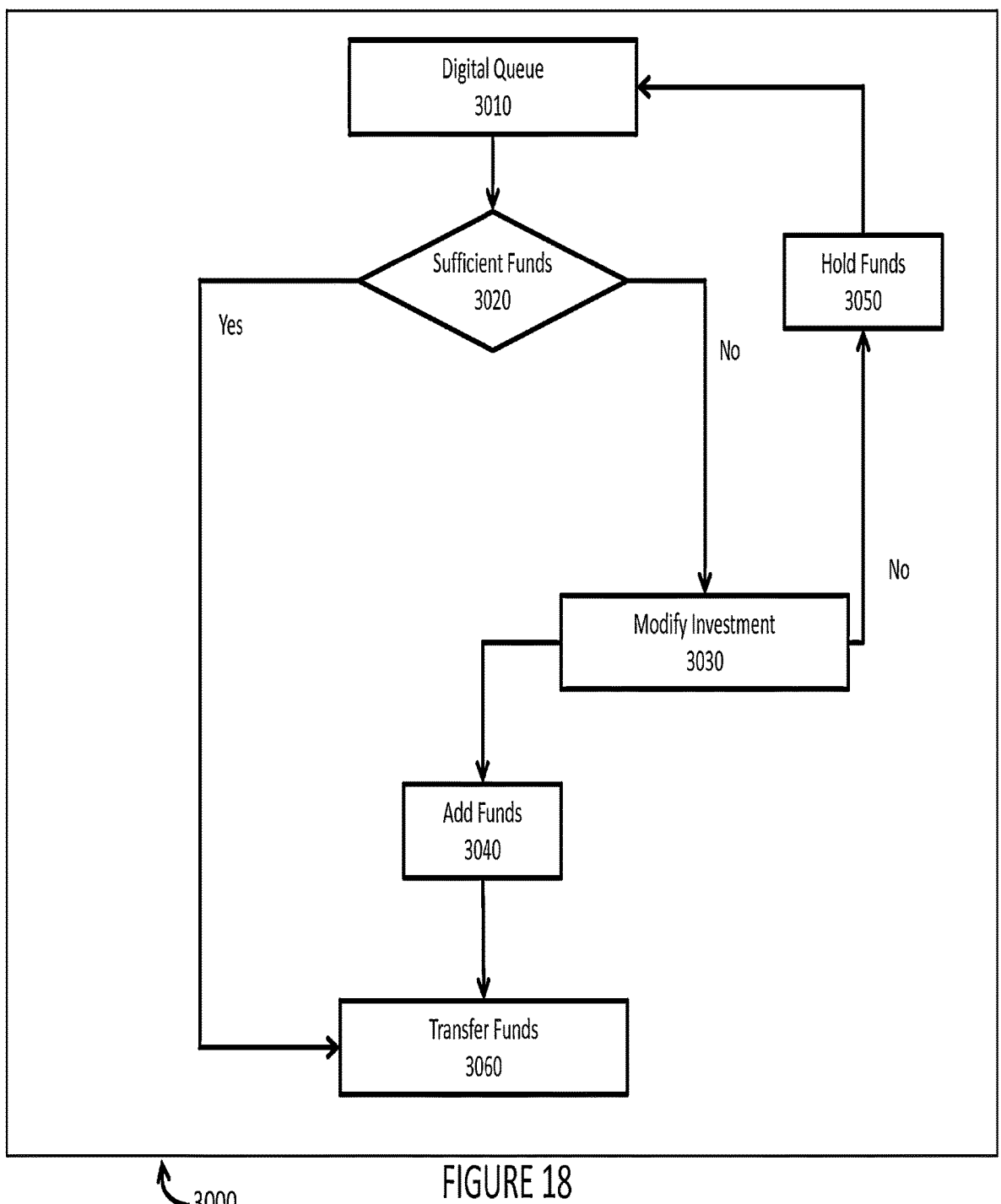
FIG. 18 depicts an additional logic flowchart illustrating an exemplary embodiment of a method for threshold triggered single user ACH.

As shown in FIG. 18, the preferred method for Threshold Triggered Single User ACH 300, could be further clarified in the logic diagram shown. Process 3000 monitors the Digital Queue (starting block 3010) and determines if there are sufficient funds (action block 3020) in the user's account to transfer funds (in other words, if the threshold in the ACH Trigger 310 has been met). If so, funds are transferred into the user's surplus account (action block 3060). If not, the user is given the opportunity to modify his/her investment (action block 3030), wherein the user may add funds (action block 3040) sufficient to trigger a transfer (action block 3060). However, if the user does not modify his/her investment, the virtual funds are held (action block 3050) and remains in the Digital Queue (action block 3010) awaiting future transfer.

Figure 19:
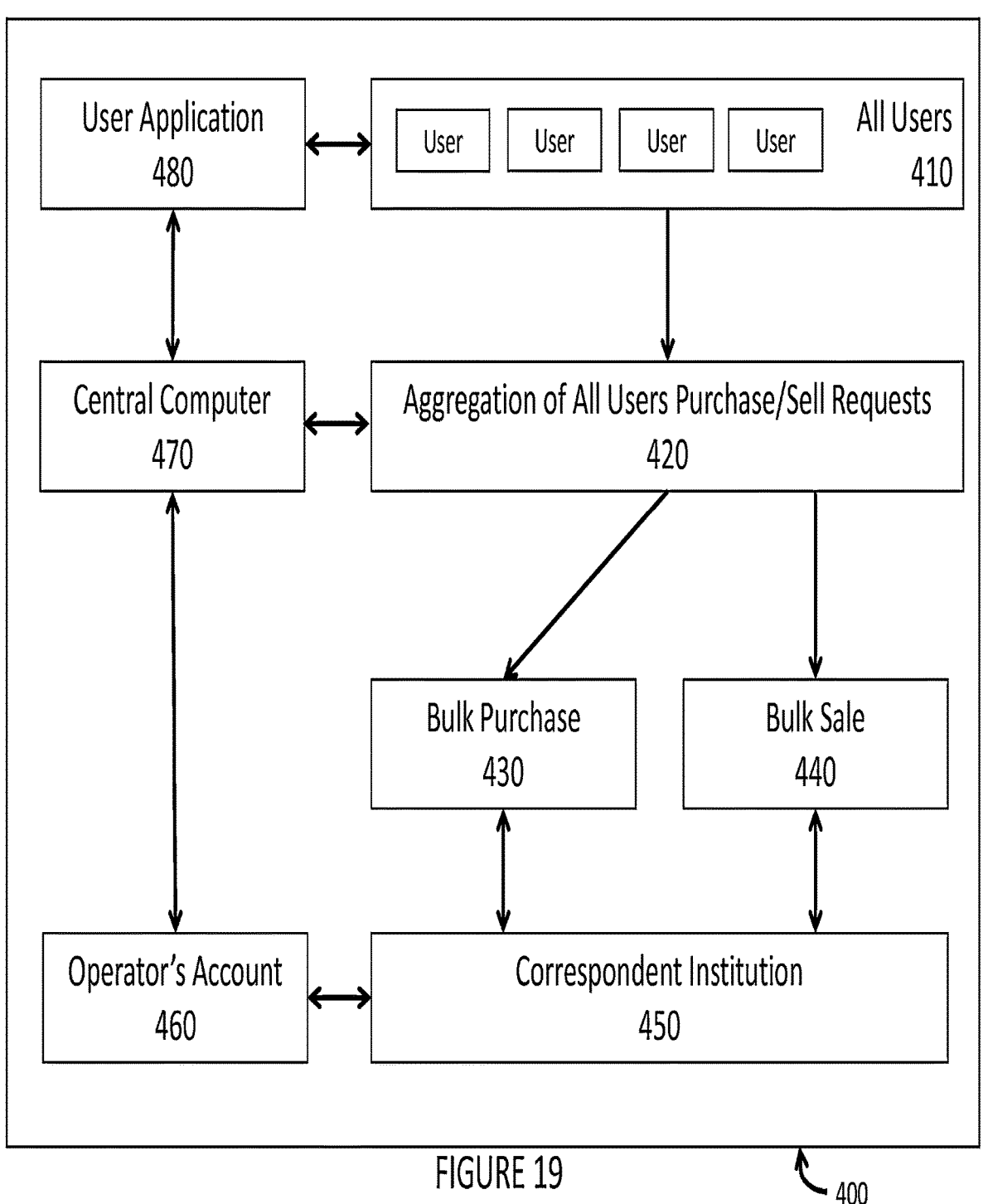
FIG. 19 depicts a flowchart illustrating an exemplary embodiment of a method for pooling aggregations for omnibus investments.

As shown in FIG. 19, the preferred method for pooling aggregations for omnibus investments 400, commences with pooling all surplus funds transferred via ACH form all users 410 into a user-approved, omnibus investment account usually managed by the invention operator (and/or his designee). Users may either purchase or sell one or more pre-qualified investments offered by the invention's operators (an alternative process may allow for investment in any investment worldwide, whether listed on a publically-traded exchange, OTC investment, or offered through private placement). The aggregation of all users purchase/sale requests 420 are batched periodically (e.g., hourly, daily, weekly, etc.) in bulk purchases 430 and bulk sales 440 through a correspondent institution 450 (e.g., bank, investment house, brokerage, etc.). Funds transfers and investment holdings are generally made and held in the Operator's account 460, although not necessarily limited thereto. Thereafter, corresponding deductions from user surplus accounts as well as apportionment of the investments are virtually divided, pro-rata, in the CENTRAL COMPUTER 470, and displayed on each user's application 480 on the USER DEVICE.

Referring back to FIG. 15, the final step in the preferred method for creating excess funds from retail transactions and apportioning those funds into investments involves providing the user with information related to his/her savings and investments in the form of a scrolling timeline of round-ups 500. Accompanying methodologies to provide historical ledgers of past transactions (i.e. here embodied as a scrolling timeline of round-ups), while varied, are well known and appreciated by those with ordinary skill in the art, and thus, will not be described herein. Notwithstanding, an exemplary embodiment of a user interface of a scrolling timeline of round-ups may be seen in FIGS. 9 and 10.

In addition to the scrolling timeline of round-ups 500, the user is provided both summary and detailed information related to his/her pro rata share of investments (not shown in FIG. 19). Such information may generally include historical purchases and sales information, provided in both tabular and graphical formats, which may be scrolled or "paged over" if the quantity of information requires. In addition, the preferred method may further provide publically-available information related to the investments, including pricing trends (usually shown as a line graph), percentage changes in pricing, financial information (e.g., 52 week price range, YTD return, etc.), financial ratios and metrics (e.g., P/E, EBITDA, etc.), and other notable information that may be of interest to an investor. Moreover, the user may be provided with current values of his/her investment(s) which is usually a simply calculated by using a standard current value formula, such as:

$$\Sigma(\text{Current price} \times \text{number of shares}).$$

or net present value (NPV) of an annuity-type investment.

Finally, in the preferred method, the user may be provided with estimated future values (EFV) of his/her investment(s) which are based on historical returns. Historical returns are calculated by looking at the asset classes that form the portfolio and studying their historical co-variances, variances, and returns. Accompanying methodologies to provide historical ledgers and charts of past transactions, real-time investment information, as well as present values and estimated future value computations, while varied and nuanced, are well known and appreciated by those with ordinary skill in the art, and thus, will not be described in great detail herein. Notwithstanding, an exemplary embodiment of a user interface of his/her investment information may be seen in FIGS. 11 and 12.

In an alternative embodiment, and for either actual or hypothetical purposes, estimated future values may be computed using a other future (FV) calculations, such as:

$$(\text{present value}) \times ((1+r)^n - 1)/r)$$

In so doing, the user may select either an automatic calculation of the rate of return (r) which may be based on the user's past performance, or the user may select predefined rates of return (e.g., 2%, 7%, 10.4%, etc.). The time period (n) are set at intervals of many years in the future (e.g., 10 years, 20 years, etc.).

In some implementations, vendor-supplied funds from electronically monitored accounts can be aggregated and transferred to an investment account. A user, in some implementations, can be signed-up to use the system (e.g. having established user names, passwords, and the like), as well as having connected financial datasets (e.g. bank data, credit card data, investment data, and the like) on the relevant application on the user device. This can also include inputting any relevant user data to sign-up or establish connections with the desired financial datasets. These features are further described below as well as in portions of the description of FIGS. 2-6.

Another method for creating funds from retail transactions and apportioning those funds into investments can include queuing up vendor-supplied funds that can be based upon a pre-agreed arrangement reflecting a particular user's spending activity as determined by the consumer's transaction history. Those funds may then be aggregated (Single Account Virtual Aggregation) by, for example, transferring the aggregation of surplus funds into a surplus account when a predefined criteria is met. In other implementations, transfers from a number of system users can be aggregated and transferred to an investment account (Batch User Aggregation For Investing). As described below, some implementations can further include displaying a user's actual and pending vendor contributions for review and further investment by the user (Scrolling Timeline of Vendor Contributions).

Figure 20:
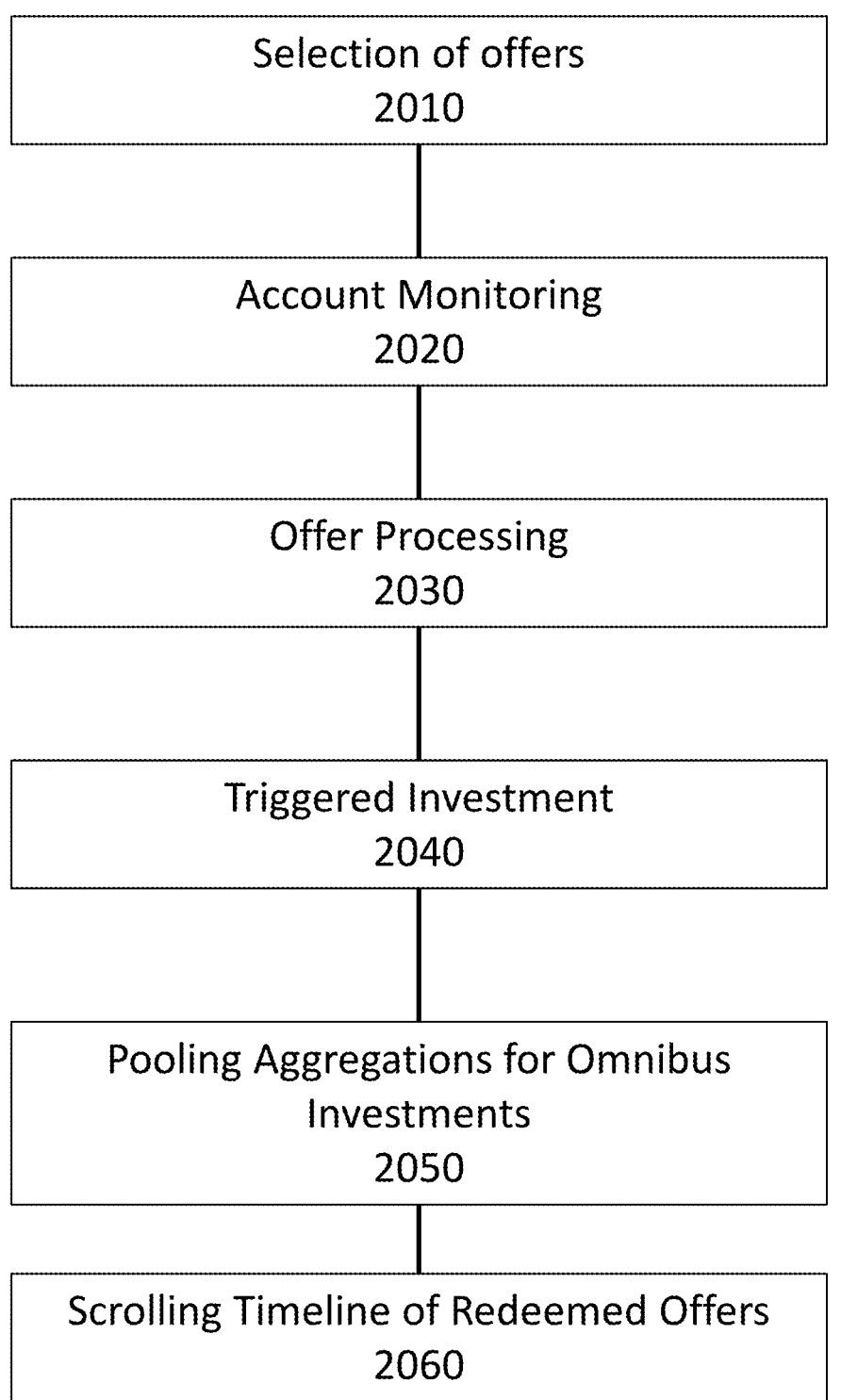
FIG. 20 depicts a flowchart illustrating an exemplary embodiment of a method for pooling aggregations from vendors for generating omnibus investments.

As shown in FIG. 20, some implementations for providing vendor-supplied funds from retail transactions and apportioning those funds into investments can involve any of the following features, in any combination, selection of offers 2010, account monitoring 2020, offer processing 2030, triggered investment 2040, batch user aggregation for investing 2050, and providing the user with information related to the redeemed offers in the form of a scrolling timeline of redeemed offers 2060.

The account monitoring can be performed by a monitoring server that collects transaction or balance data (herein referred to as "transaction data") cached at accounts being monitored, for example, credit card and checking accounts. The monitoring server can monitor the account server for a change to the transaction data, where the change can correspond to an entry in the transaction data that is associated with a vendor. The monitoring server can be part of the central computer 220 or a separate server acting as an intermediary between the central computer 220 and the accounts being monitored. A change can correspond to a purchase, a credit, a debit, or the like. The entry can be any kind of electronic data that reflects the details of the transaction (e.g. vendor name, time, amount, user ID, or the like).

The central computer 220 can receive the transaction data transmitted from the monitoring server. The monitoring server can collect the transaction data by different types of connections, for example, establishing a direct connection with an application programming interface (API) or a secondary connection used for scraping webpage data from a webpage linked to the to the monitored account at the account server. Scraping can include receiving and translating the displayed characters on the webpage linked to the account based on character recognition or an identification of a displayed format of the webpage. In other implementations, the scraping can include reading the webpage code (e.g. the HTML code) and extracting the transaction data. Transaction data sent to the central computer 220 can include, for example, a merchant name, transaction amount, transaction date and/or time, transaction location, a merchant category, and a confidence score generated by the monitoring server. The confidence score can represent the probability that the transmitted transaction data is accurate, based on the method of data collection. For example, a direct API connection may typically generate a high confidence score because there is no interpretation required. Conversely, scraping a graphical webpage (e.g. a high-level summary of transactions) can be more error-prone and hence can, in some cases, cause the confidence score to be lower.

The monitoring server can, at a first interval, import transaction data to the central computer from various sources, e.g. credit card companies and banks. These transactions can then be put into a pending digital queue with a second method and at a second interval. Either of the first interval or second interval can be, for example, in real-time (as fast as the system allows), fractions of a second (e.g. 0.1, 0.3, 0.7 seconds, or the like), seconds (e.g. 1, 3, 5, 7, 10, or the like), minutes or less, hours or less, daily, weekly, monthly, or any desired frequency or interval, as programmed into the system.

Figure 21:
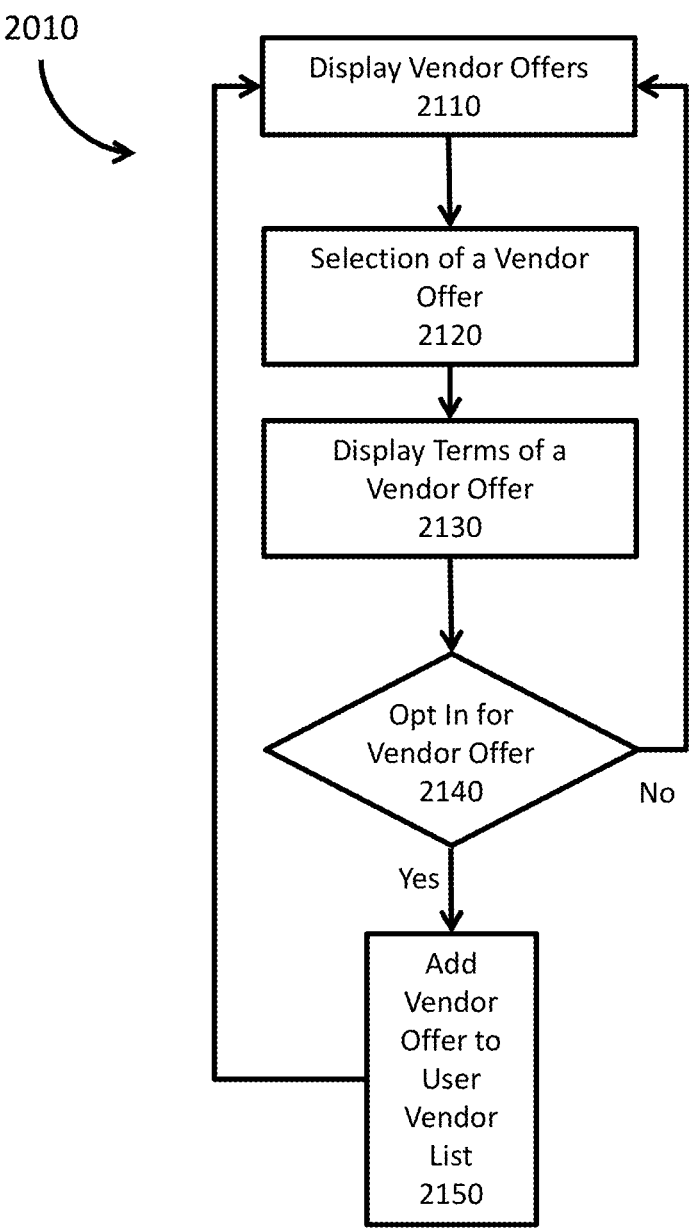
FIG. 21 depicts a flowchart illustrating an exemplary embodiment of a method for selecting vendors that provide offers to be aggregated.

FIG. 21 depicts a flowchart illustrating an exemplary embodiment of a method for selecting vendors that provide offers to be aggregated. In some implementations, one method for selection of offers 2010 can include a list of vendor offers being displayed on the computing device. Offers can be displayed with information indicating to the user the category of vendor requirement to redeem the offer. In some implementations, there can be at least three methods for a user to select an offer. A first method can involve the user utilizing a registered credit or debit card for the vendor transaction. A second method can involve an active user opt-in. After selection of an offer, a screen can be displayed that includes the terms of the offer. When the terms of an offer are accepted verification can be transmitted to the central computer 220. The verification can be, for example, in the form of electronic data generated by user input received at the user device. The third method can be a variation of the second method, but instead of (or in addition to) monitoring the transactions, the central computer 220 can receive periodic updates of purchases, redeemed offers, or other data from the vendor that is associated with offer logic to initiate the transfer or generation of vendor-supplied funds to the pending digital queue. These updates can be processed and added to a pending digital queue (described further with reference to FIG. 22). As one example, when a user signs-up for a service or offer from the vendor, the vendor can transmit an electronic confirmation of the sign-up or otherwise identify the act that took place with regard to the vendor. The electronic confirmation can contain an identifier that can associate the sign-up, redeemed offer, etc. with a predefined amount of vendor-supplied funds. In this way, the additions to the digital queue, for the third method or any other implementation described herein, need not be exclusively tied to purchases, but can be based on any instruction received from the vendor to add vendor-supplied funds to the pending digital queue.

The first method can involve or suggest, for example by a user prompt at a graphical interface, that a registered credit card (or other payment method) be used to select a vendor offer. The registered credit card can be credit cards or other accounts that have been previously linked to the system. See for example, the linking and verification implementations described with reference to FIGS. 4 and 5.

For the second method, the user can select the offer and then actively opt in, for example through a graphical interface or other input device, in order to select the offer from the associated vendor list.

The third method can include, for example, at the point of opt-in 2140, the system transfers a displayed webpage from a local webpage or user screen (e.g. where the user is opting-in for a vendor offer) to a vendor webpage or screen. Once transferred, the user can complete an action, for example, a purchase, a sign-up, or the like, that references the displayed offer from 2130. However, in this variation, the central computer 220 can receive, at predefined intervals (e.g. hourly, daily, weekly, monthly, or the like), vendor data that includes a list of users that have successfully completed the offers. In some implementations, the vendor data can include a table with a user identification, an offer identification, and an amount, though any combination of identifiers for the user, offer, and offer details can be provided by the vendor. The vendor data can be incorporated into the pending digital queue. The process of adding vendor-supplied funds can then proceed as described herein. The vendor data can be provided by push notifications from a server at the vendor or associated third-party, or can be received as a result of pulls or requests from similar computing systems.

In some implementations, the selection of offers 2010 can include the followings features. At 2110, vendor offers can be displayed at a graphical user interface. The vendor offers can be populated from a list of vendors maintained at the central computer 220. The vendor offers can be generated upon a user's input at the mobile application, or automatically generated any time the corresponding display screen is created at a computing device.

At 2120, a vendor offer from the displayed vendor offers can be selected by user input received at the computing device.

At 2130, once selected, the terms of a vendor offer can be displayed at the graphical user interface. The terms, for example, can be in the form of a contract or user agreement, and can be presented for acceptance by a user.

At 2140, based on user input received at the graphical user interface or at any connected input device, a user may opt in for accepting the vendor offer. When a user does not opt in to the vendor offer, the graphical interface can continue to display vendor offers for later selection. The displayed list of vendor offers can be automatically updated by the system based on detection of new participating vendors (and their corresponding vendor identification), referenced electronically at the central computer 220. The option described at 2140 can, in some implementations, be present only when the second method is in use. For example, when using a registered credit card, the user has already explicitly "opted in" by virtue of registering the credit card as described above. Therefore, there would not be a need for an additional opt-in. However, in other implementations there may be any number of verifications or other security measures taken where the user may have to reselect or "opt-in" any number of times before the vendor offer is added to a vendor list.

At 2150, when the user has opted in or otherwise confirmed selection of the vendor offer, the vendor offer can be added to the list of vendors that are monitored on the user account. These vendors can be polled, at the first interval, to identify transactions that have occurred with these vendors since the last receipt of transaction data.

Figure 22:
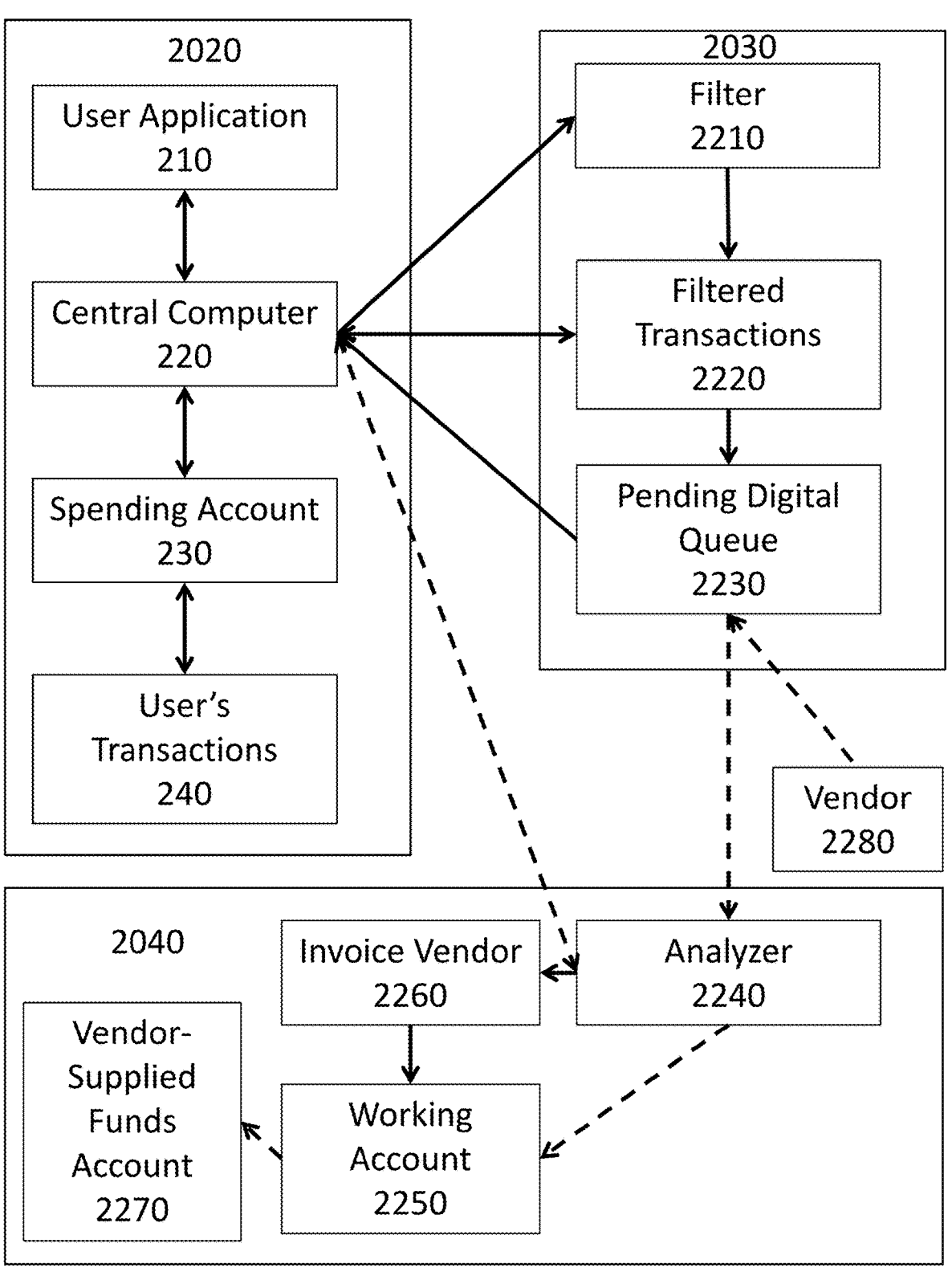
FIG. 22 depicts a system for pooling aggregations from vendors for generating omnibus investments.

FIG. 22 depicts a system for pooling aggregations from vendors for generating omnibus investments. Other features of the system (e.g. the account monitoring 2020) are also discussed with regard to FIG. 16 and FIG. 20.

As shown in FIG. 22, a method for account monitoring 2020 and transaction filtering 2030 and invoicing and investment 2040, can begin with the user, through the user application 210, authorizing the central computer 220 to access data stores for the user's spending account 230 that contains records of the user's transactions 240 (e.g., credit card data).

The accessing can be performed at a frequency or interval determined by a third-party provider (providing a database and control computer implementing the features 2030). The interval can, for example, be on the order of seconds, minutes, from 10 minutes to 50 minutes, or hours, though shorter or longer times between accesses can be determined and set by the third party provider. The user's transactions

240 in a spending account are returned, usually through the user's spending account 230, to the central computer 220, as a list of transactions.

By way of example, a hypothetical and non-limiting list of user's transactions 24 (e.g. credit card data) might result in the following ledger of transactions:

| Date | Name | Amount | Transaction Type | Category |
|------|------|--------|-------------|----------|
| Jan. 1, 2014 | Starbucks | −$ 4.15 | Debit | Coffee Shop |
| Jan. 2, 2014 | Albertson's | −$ 25.09 | Debit | Groceries |
| Jan. 2, 2014 | Check | $250.00 | Credit | Unspecified |
| Jan. 2, 2014 | Macy's | −$ 44.12 | Debit | Retail |
| Jan. 3, 2014 | Bank of America | −$ 4.00 | Debit | Bank Fee |
| Jan. 3, 2014 | Starbucks | −$ 4.15 | Debit | Coffee Shop |
| Jan. 4, 2014 | Arco | −$ 61.01 | Debit | Gasoline |
| Jan. 4, 2014 | [ ] | $ 4.00 | Debit | Bank Fee Refund |
| Jan. 5, 2014 | [Operator] | −$ 5.00 | Debit | Investment |

Most users are anticipated to use a credit card as the source of their primary spending account. However, it is important to note that a user's transactions 240, are not necessarily limited to a spending account, and may be a bank (debit card spending), a prepaid charge card, proprietary credit account, rewards program or the like. In some implementations, the source of such information can be the computer system where the user's spending account(s) reside.

Because the user's transactions 240 can be debit transactions for which there may be no vendor offer, the central computer 220, can process all transactions through a filter 2210, so that those may be processed in a different fashion. Thus, the central computer 220, can return an abridged list of transactions to its internal databases (e.g., the filtered transaction 2220), which are later transmitted to the pending digital queue 2230 and/or user application 210.

The central computer can compare the "Name" field and determine if the data in the name field matches a vendor name in the database. This database can have multiple entries for the same vendor since the same vendor name can show up as a slightly different name in the transaction list.

| Name | Vendor ID |
|------|-----------|
| Starbucks | 832 |
| Starbucks Inc. | 832 |
| Macys | 124 |
| Macy's | 124 |

Continuing with the example above, there can be vendor offers for Starbucks, Macy's and Albertsons. Therefore the filtered transactions 2220 would yield:

| Date | Name | Amount | Transaction Type | Category |
|------|------|--------|-------------|----------|
| Jan. 1, 2014 | Starbucks | −$ 4.15 | Debit | Coffee Shop |
| Jan. 2, 2014 | Albertson's | −$25.09 | Debit | Groceries |
| Jan. 2, 2014 | Macy's | −$44.12 | Debit | Retail |
| Jan. 3, 2014 | Starbucks | −$ 4.15 | Debit | Coffee Shop |
| Jan. 4, 2014 | Starbucks | −$ 4.15 | Debit | Coffee Shop |

The filter 2210 can employ any number of filtering technologies. In one implementation, the filter 2210 can allow records to be retained where accompanying transactional metadata meets certain criteria. For example, "Transaction Type" and "Name" field can be cross-referenced against a database residing on the central computer 220 for selected vendor offers, thereby eliminating undesirable ledger entries (e.g., name="Bank of America", or amount="0.00").

In other implementations, the list of filtered transactions 2220 can be passed along to the pending digital queue 2230. The filtered transactions 2220 can be a table, list, object references to account entries, or the like. The filtered transactions can include a user ID for the customer whose transaction it represents as well as an offer ID that identifies the matching vendor offer of the filter 2210 identified as matching the transaction.

The user ID can be an internal identifier for the user corresponding to the user's transactions 240 that are accessed by the central computer 220. In this implementation, all the transaction lists for each user can be aggregated into the digital queue for improved data consolidation, thereby removing the requirement to maintain multiple digital queues for each user. The user ID can be created when the user creates an account and uniquely associates them with that account internally, independent of changes to email address, phone number, or the like. The offer ID can be assigned when an offer for a particular vendor is generated by the system. Each vendor may have more than one offer that can be active in the system, monitored, or the like. An implementation of the pending digital queue 2230, in this example, can appear as:

| Date | Name | Amount | Transaction Type | User ID | Offer ID |
|------|------|--------|------------------|---------|----------|
| Jan. 1, 2014 | Starbucks | –$ 4.15 | Debit | 1234 | 2 |
| Jan. 2, 2014 | Albertson's | –$25.09 | Debit | 1234 | 1 |
| Jan. 2, 2014 | Macy's | –$44.12 | Debit | 1234 | 3 |
| Jan. 3, 2014 | Starbucks | –$ 4.15 | Debit | 1234 | 2 |
| Jan. 4, 2014 | Starbucks | –$ 4.15 | Debit | 1234 | 2 |
| Dec. 20, 2014 | Starbucks | –$ 3.23 | Debit | 3245 | 2 |
| Dec. 20, 2014 | Albertson's | –$20.10 | Debit | 3245 | 1 |
| Dec. 21, 2014 | Albertson's | –$25.00 | Vendor | 1234 | 4 |

Referring back to the third method of populating the pending digital queue 2230, the example illustrated in the last row in the table above shows a vendor-supplied offer received from a participating vendor 2280. Here, the redeemed offer from the vendor was not a transaction that was monitored by the central computer 220, but rather vendor data received from the vendor 2280. The vendor data can reference offers/purchases performed at the vendor 2280 or otherwise provided from the vendor 2280. Based on the amount and offer ID, the vendor data in the last column can be processed to provide vendor-supplied funds according to the rule corresponding to the offer ID.

The pending digital queue 2230 can be periodically analyzed by the analyzer 2240 to determine how to process each transaction in the queue. The analyzer 2240 can be programmed with a set of rules to process each transaction. The rules can be in a variety of forms. For example, there can be a vendor offer rule that states a processing procedure for each vendor offer. In one implementation, the pending vendor-supplied funds can be immediately processed such that the vendor-supplied fund amount is simultaneously (or with a preprogrammed delay) invoiced to the vendor by sending the transaction to invoice vendor 2260 and the corresponding amount of vendor-supplied funds moved from working account 2250 to a vendor-supplied funds account 2270 where it is ready for investing. The invoice vendor can be a subsystem or separate computer that generates and transmits an electronic invoice to a vendor computer. The vendor-supplied funds account 2270 can store any number of vendor-supplied funds corresponding to the user's transactions.

For another vendor, the rule can cause the vendor supplied funds to be invoiced immediately, but not processed from the working account 2250 to the vendor-supplied funds account 2270 for some period of time, (e.g. 1 day, 1 week, 30 days, 60 days, or the like). The working account can be part of the central computer 240, or maintained as a third-party server that receives transfer commands from the central computer 240. Similarly there can be a user rule that can be combined with a vendor rule. For example, for a particular user all vendor offers can be processed immediately overriding a built-in delay in a vendor offer rule or that the vendor offer may be augmented with additional non-vendor funds such as from the company that offers the application. Conversely, a built-in delay can be added for a particular user whose account is being reviewed that overrides any vendor offer rules.

Figure 23:
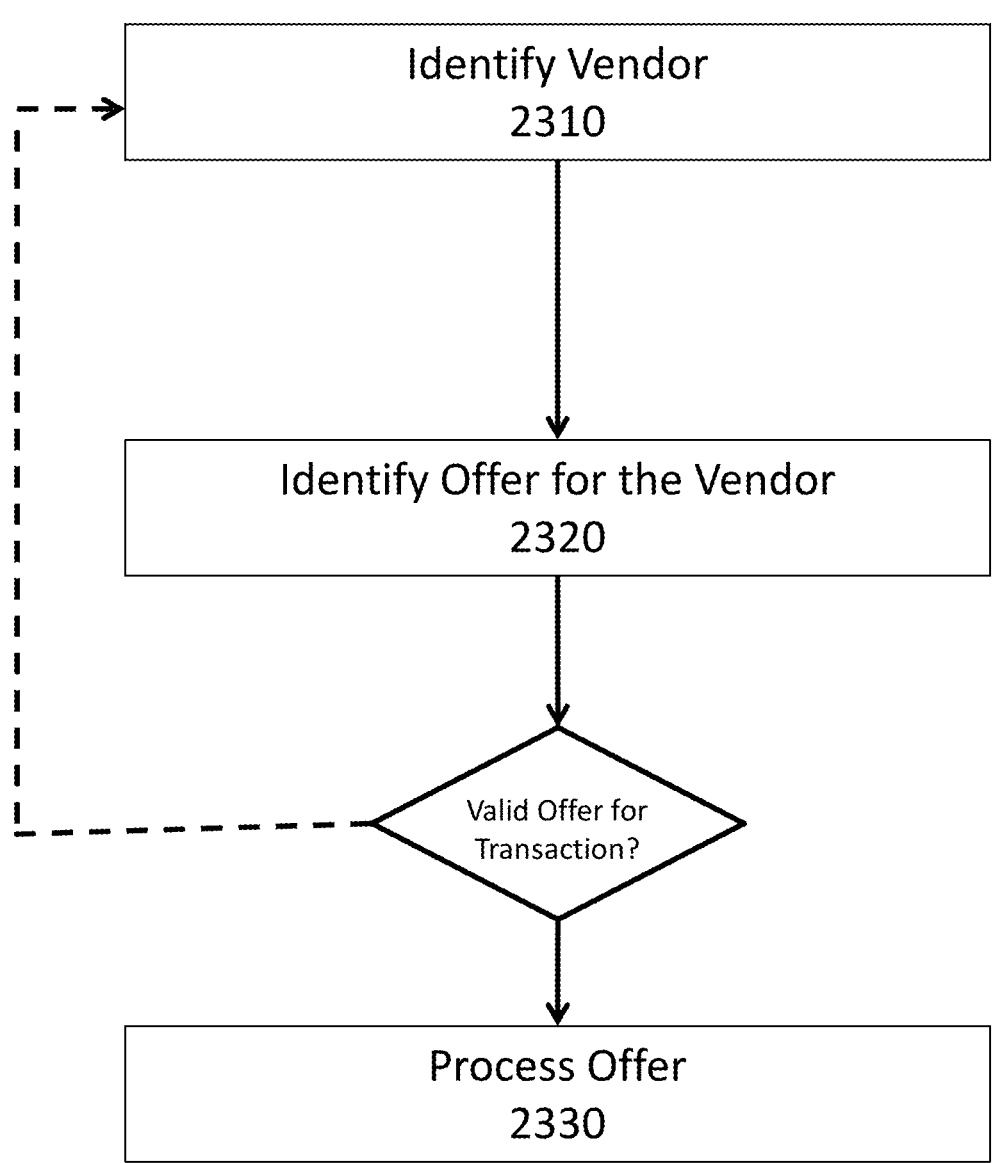
FIG. 23 depicts a flowchart illustrating determination of offers valid for aggregation from identified vendors.

FIG. 23 depicts a flowchart illustrating a determination of offers valid for aggregation from identified vendors.

At 2310, for each transaction in the queue, the vendor field can be extracted. Then the appropriate vendor offer for transaction can be identified by providing the transaction data and the user account information to the analyzer 2240 with the identified offer.

At 2320, the offer can be identified based at least on predetermined offer logic for an offer (identified based on associated offer logic ID associated with the offer ID for the corresponding transaction) by executing the analyzer 2240 utilizing the supplied user's transaction data 240 and user account information.

At 2330, when the specified offer is applicable, then the system proceeds to apply the offer and generate the vendor-supplied funds for aggregation.

| Vendor Offer # | Vendor | Offer Logic ID |
|----------------|--------|----------------|
| SBUX5 | 832 | 54321 |
| SBUX10 | 832 | 55692 |
| MACY5 | 124 | 60301 |

Once the vendor-supplied funds are transferred to the vendor-supplied funds account 2270, they can be processed for investing as previously described in, for example, FIG. 19, that describes a method 400 for pooling aggregations for omnibus investments.

Figure 24:
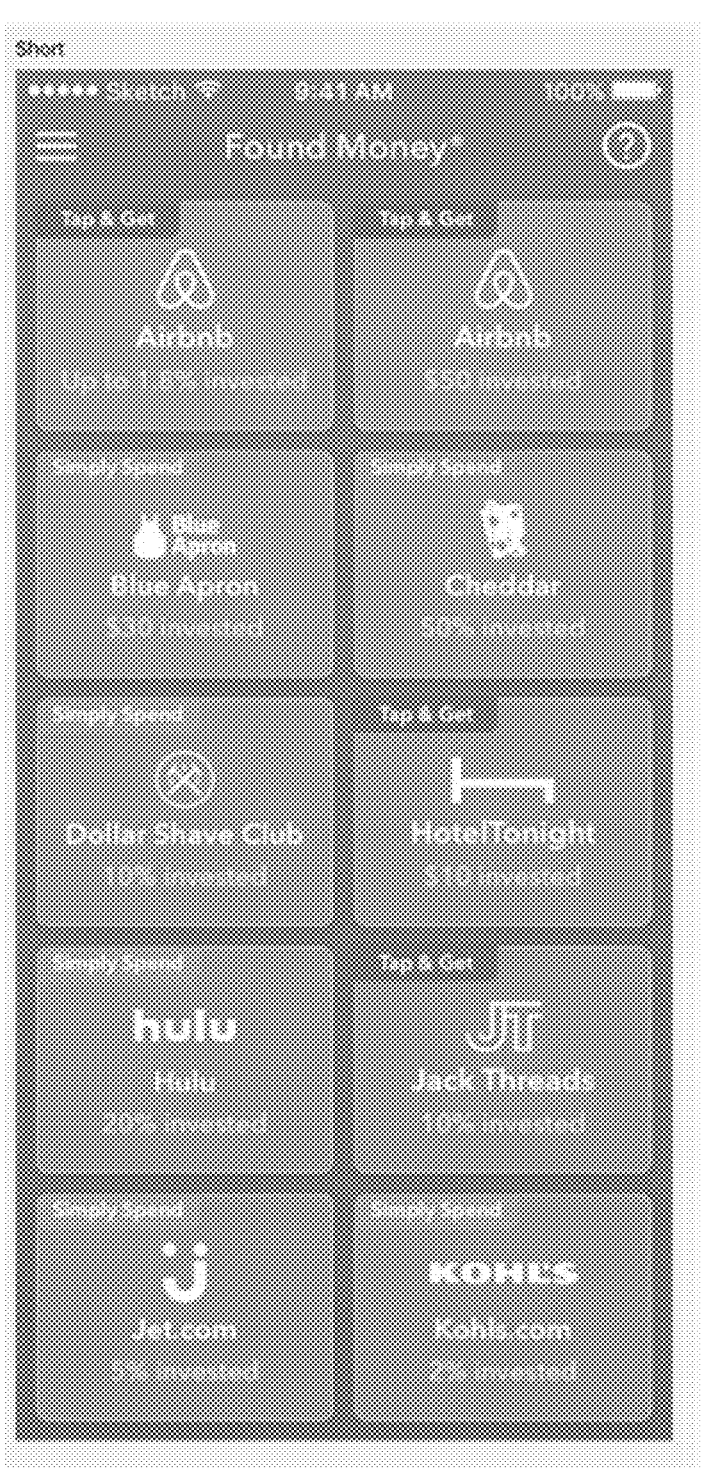
FIG. 24 depicts a screenshot of a graphical display generated by a mobile application illustrating vendor offers.

FIG. 24 depicts a screenshot of a graphical display generated by a mobile application illustrating vendor offers. The graphical display can include any number or arrangement of icons that can be selected by user input. User input can include, for example, touching the appropriate part of the screen corresponds to the icon, selection via virtual or actual keyboard, input from a mouse, or the like. The icons can also include an indication of the different methods for signing up and/or retrieving vendor-supplied funds. Each icon can include, for example the vendor name, a description of the amount or percentage of a purchase that will be generated as vendor-supplied funds, etc. The displayed icons that are associated with a vendor can be based on, for example, a list of participating vendors stored at the central computer, or maintained by a third-party system. Though shown as a mobile application, similar functionality can be implemented on any type of computer, for example, a laptop, desktop, notepad, or the like.

Figure 25:
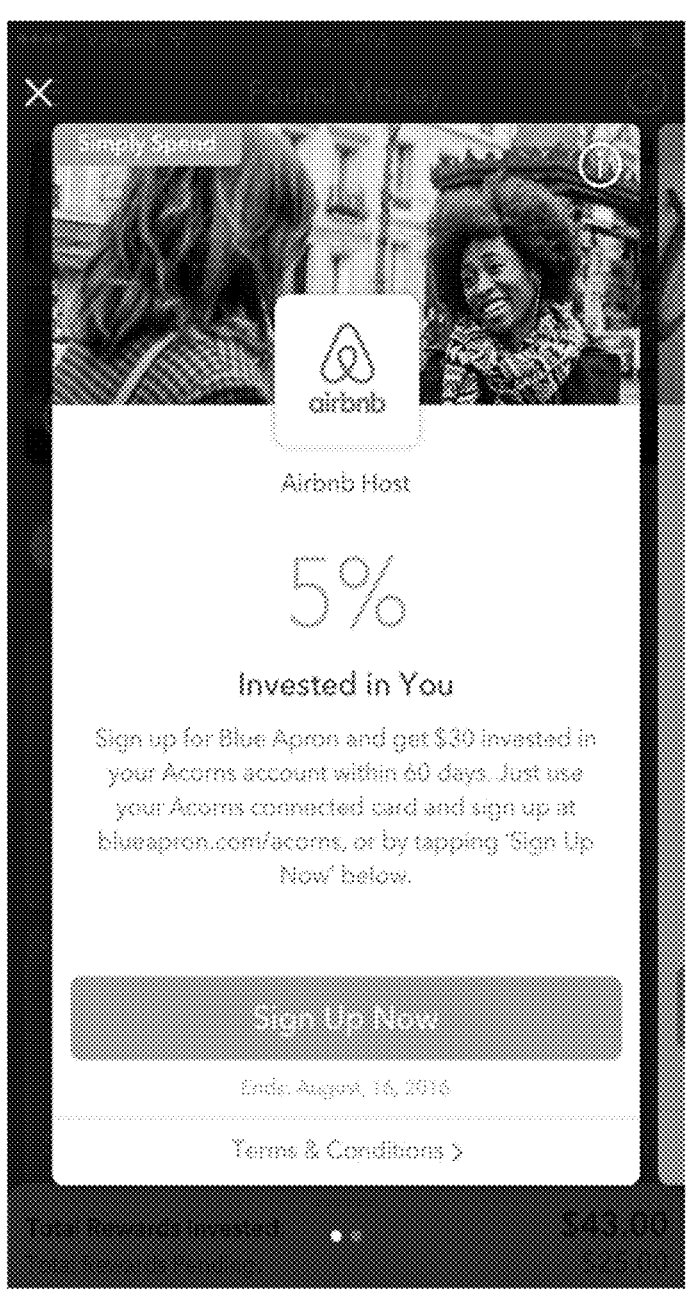
FIG. 25 depicts a screenshot of a graphical display generated by a mobile application illustrating a displayed offer by a valid vendor.

FIG. 25 depicts a screenshot of a graphical display generated by a mobile application illustrating a displayed offer by a valid vendor. When an offer is selected from the displayed choices (e.g. as shown in FIG. 24), a sign-in screen can be displayed for the user to opt in to participate in the vendor-supplied funds program. Once enrolled, the user's account can be monitored as described herein to transfer accumulated vendor-supplied funds to another account, for example, an investment account.

Figure 26:
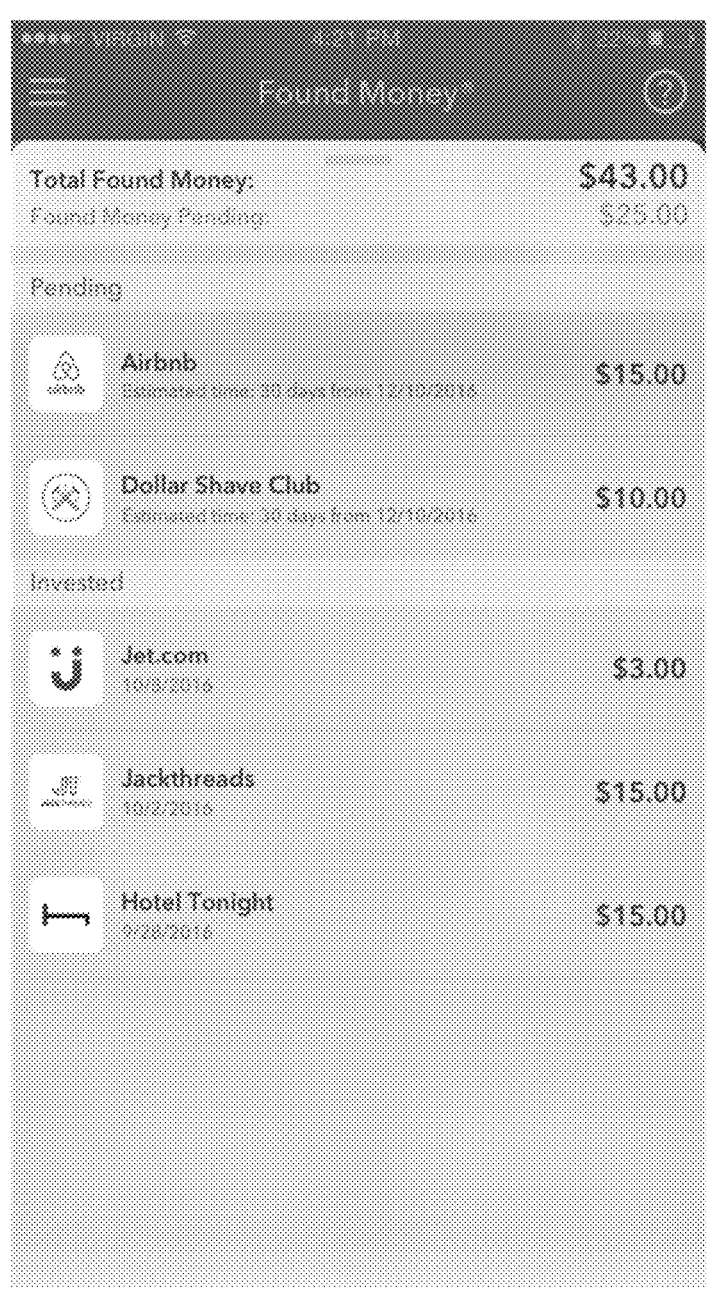
FIG. 26 depicts a screenshot of a graphical display generated by a mobile application illustrating pending and invested aggregates from vendors.

FIG. 26 depicts a screenshot of a graphical display generated by a mobile application illustrating pending and invested aggregates from vendors. One implementation, a graphical interface can display a listing of pending vendor-supplied funds and previously transferred vendor-supplied funds. As shown in FIG. 26, the pending vendor-supplied funds can correspond to the funds contained in the pending digital queue 2230. For example, the vendor name, amount in the digital queue 2230 corresponding to the vendor, and an estimated date/time for transfer of the vendor-supplied funds can be displayed.

In other implementations, a similar display of invested amounts (e.g. the vendor-supplied funds transferred to the vendor-supplied funds account 2270 for investment) can be generated at the mobile device. Here, the amounts can reflect the amount of vendor-supplied funds previously invested, the vendor name, and the date of investment.

Any of the above-described processes and methods may be implemented by any now or hereafter known computing device. For example, the methods may be implemented in such a device via computer-readable instructions embodied in a computer-readable medium such as a computer memory, computer storage device or carrier signal.

Because of the high-level nature and complexity of the selections and methods described herein, including the multiple and varied combinations of different calculations, computations and selections, such selections and methods cannot be done in real time quickly, or at all, by a human. The processes described herein rely on the machines described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The preceding described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method comprising:
  receiving, over a network from a user application operating on a user device, authorization to access an account server;
  monitoring a balance of an account of the user at the account server based on the received authorization;
  during monitoring the balance, detecting a change to the balance via network communication with the account server;
  based on the detected change, obtaining transaction data associated with the change, wherein the transaction data is obtained based on at least one of:
    scraping a website of the account server, or
    communicating with the account server via an API,
      wherein the transaction data associated with the change comprises a transaction amount and identification of a vendor that received payment from the user;
  determining a vendor offer, from among a plurality of vendor offers stored in an electronic data store, that is applicable to the transaction data, wherein the vendor offer is determined based at least in part on the identification of the vendor in the transaction data;
  retrieving logic previously associated with the vendor offer, wherein each of the plurality of vendor offers is associated with different stored logic in the electronic data store;
  determining, by applying the retrieved logic previously associated with the vendor offer, an amount of vendor-supplied funds for transfer to an investment account associated with the user; and
  based at least in part on the retrieved logic previously associated with the vendor offer:
    transferring the determined amount of vendor-supplied funds to the investment account associated with the user;
    simultaneously or with a preprogrammed delay relative to the transferring of the determined amount of vendor-supplied funds, generating an electronic invoice indicating the determined amount of vendor-supplied funds; and
    transmitting the electronic invoice to a computing system associated with the vendor that received payment from the user.

2. The computer-implemented method of claim 1, wherein determining the vendor offer comprises determin-
ing a vendor offer identifier previously associated with the vendor in the electronic data store, wherein the vendor offer identifier is further uniquely associated within the electronic data store with an offer logic identifier that identifies the logic for the vendor offer.

3. The computer-implemented method of claim 1, further comprising determining a confidence score associated with the transaction data, wherein the confidence score is determined based at least in part on whether the transaction data was obtained via the API or via scraping the website of the account server.

4. The computer-implemented method of claim 1, wherein the retrieved logic causes the amount of vendor-supplied funds to be generated as an indicated percentage of the transaction amount in the transaction data.

5. The computer-implemented method of claim 1, wherein the retrieved logic causes the amount of vendor-supplied funds to be generated as a predetermined dollar value previously associated with the vendor offer prior to the detected change.

6. The computer-implemented method of claim 1, wherein determining the vendor offer that is applicable to the transaction data comprises determining that a vendor name field in the transaction data matches a vendor name in the electronic data store that stores offers associated with a plurality of vendor offers.

7. The computer-implemented method of claim 1, further comprising:
  generating a user interface for display to the user, wherein the user interface comprises a plurality of graphical objects that each present information regarding a different vendor offer of the plurality of vendor offers, the information including (a) a vendor name and (b) an offer amount or percentage offered as vendor-supplied funds in association with a vendor-related transaction.

8. The computer-implemented method of claim 1, further comprising:
  prior to determining the vendor offer, applying a filtering process that eliminates, from the transaction data, consideration of transactions that would lead to one or more indefinite loops by a computing system implementing the computer-implemented method.

9. The computer-implemented method of claim 8, wherein the filtering process eliminates a transaction comprising at least one of a user deposit, a third party credit, a bank fee, or a transaction by an operator of the computing system.

10. The computer-implemented method of claim 1, wherein the transaction data is obtained by scraping the website of the account server.

11. The computer-implemented method of claim 10, wherein the scraping includes receiving and translating characters on a webpage associated with the account of the user.

12. The computer-implemented method of claim 10, wherein the scraping includes extracting the transaction data based at least in part on code of a webpage.

13. A computing system comprising:
  an electronic data store that stores a plurality of vendor offers; and
  a processor configured with executable instructions that cause the processor to perform operations comprising:
    receiving, over a network from a user application operating on a user device, authorization to access an account server;
    monitoring a balance of an account of the user at the account server based on the received authorization;

in association with the monitoring the balance, detecting a change to the balance via network communication with the account server;

based on the detected change, obtaining transaction data associated with the change, wherein the transaction data is obtained based on at least one of:

scraping a website of the account server, or communicating with the account server via an API, wherein the transaction data associated with the change comprises a transaction amount and identification of a vendor that received payment from the user;

determining a vendor offer, from among the plurality of vendor offers stored in the electronic data store, that is applicable to the transaction data, wherein the vendor offer is determined based at least in part on the identification of the vendor in the transaction data;

retrieving logic previously associated with the vendor offer, wherein each of the plurality of vendor offers is associated with different stored logic in the electronic data store;

determining, by applying the retrieved logic previously associated with the vendor offer, an amount of vendor-supplied funds for transfer to an investment account associated with the user; and based at least in part on the retrieved logic previously associated with the vendor offer:

transferring the determined amount of vendor-supplied funds to the investment account associated with the user;

simultaneously or with a preprogrammed delay relative to the transferring of the determined amount of vendor-supplied funds, generating an electronic invoice indicating the determined amount of vendor-supplied funds; and transmitting the electronic invoice to a computing system associated with the vendor that received payment from the user.

14. The computing system of claim 13, wherein the retrieved logic causes the amount of vendor-supplied funds to be generated as an indicated percentage of the transaction amount in the transaction data.

15. The computing system of claim 13, wherein the retrieved logic causes the amount of vendor-supplied funds to be generated as a predetermined dollar value previously associated with the vendor offer prior to the detected change.

16. The computing system of claim 13, wherein determining the vendor offer that is applicable to the transaction data comprises determining that a vendor name field in the transaction data matches a vendor name in the electronic data store.

17. The computing system of claim 13, wherein the operations further comprise:

generating a user interface for display to the user, wherein the user interface comprises a plurality of graphical objects that each present information regarding a different vendor offer of the plurality of vendor offers, the information including (a) a vendor name and (b) an offer amount or percentage offered as vendor-supplied funds in association with a vendor-related transaction.

18. The computing system of claim 13, wherein the operations further comprise:

prior to determining the vendor offer, applying a filtering process that eliminates, from the transaction data, consideration of transactions that would lead to one or more indefinite loops by the computing system.

* * * * *